United States Patent
Benjebbour et al.

(10) Patent No.: US 7,773,948 B2
(45) Date of Patent: *Aug. 10, 2010

(54) COMMUNICATION DEVICE AND COMMUNICATION METHOD

(75) Inventors: Anass Benjebbour, Yokosuka (JP); Takahiro Asai, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1048 days.

This patent is subject to a terminal disclaimer.

(21) Appl. No.: 11/455,635

(22) Filed: Jun. 20, 2006

(65) Prior Publication Data

US 2006/0290819 A1    Dec. 28, 2006

(30) Foreign Application Priority Data

Jun. 20, 2005   (JP)   ............................. 2005-179894

(51) Int. Cl.
H04B 1/00        (2006.01)
H04B 15/00       (2006.01)

(52) U.S. Cl. .................. 455/63.1; 455/63.3; 455/67.13; 455/296; 375/346; 375/349; 375/350

(58) Field of Classification Search .................. 455/39, 455/63.1, 63.2, 63.3, 67.13, 295, 296, 306, 455/307, 552.1, 553.1; 375/340, 343, 346, 375/349, 350

See application file for complete search history.

(56) References Cited

U.S. PATENT DOCUMENTS 5,396,657 A * 3/1995 Jokinen ....................... 455/307
5,519,735 A * 5/1996 Rice et al. .................... 375/347
6,233,594 B1 * 5/2001 Tan et al. ..................... 708/313
6,510,313 B1 * 1/2003 Rapeli ......................... 455/323
6,628,728 B1 * 9/2003 McCarty, Jr. ................ 375/296
2001/0055320 A1 * 12/2001 Pierzga et al. ............... 370/480
2003/0156603 A1 * 8/2003 Rakib et al. .................. 370/485
2003/0176169 A1 * 9/2003 Pajukoski et al. ............. 455/77

FOREIGN PATENT DOCUMENTS

GB    2 343 332      5/2000
WO    WO 99/25075    5/1999

OTHER PUBLICATIONS

William A. Gardner, "Exploitation of Spectral Redundancy in Cyclostationary Signals", IEEE Signal Processing Magazine, vol. 8, No. 2, Apr. 1991, pp. 14-36.

(Continued)

*Primary Examiner*—Tuan H Nguyen
(74) *Attorney, Agent, or Firm*—Oblon, Spivak, McClelland, Maier & Neustadt, L.L.P.

(57) ABSTRACT

A communication device used in a first communication system under a frequency sharing environment where the first communication system and a second communication system establish communications within the same frequency band is disclosed. The communication device comprises a detector for detecting an interfering signal from the second communication system; and a determiner for determining transfer characteristics of a shaping filter according to a result of the detection, the shaping filter being used for a desired signal of the first communication system.

6 Claims, 24 Drawing Sheets

OTHER PUBLICATIONS

William A. Gardner, "Cyclic Wiener Filtering: Theory and Method", IEEE Transactions on Communications, vol. 41, No. 1, Jan. 1993, pp. 151-163.

R. Veljanovski, et al., "A low-power reconfigurable digital pulse-shaping filter for an utra-TDD Mobile Terminal Receiver", The 2002 45th., Midwest Symposium on Circuits and Systems., Conference Proceedings., Tulsa, Aug. 4-7, 2002, vol. 2, Aug. 4, 2002, pp. 1-4, XP010635309.

William A. Gardner, et al., "Making the Most Out of Spectral Redundancy in GSM: Cheap CCI Suppression", Conference Record of the 35th. Asilomar Conference on Signals, Systems, & Computers. Pacific Groove, CA, Nov. 4-7, 2001, vol. 1, Nov. 4, 2001, pp. 883-889, XP010581044.

\* cited by examiner

FIG.2
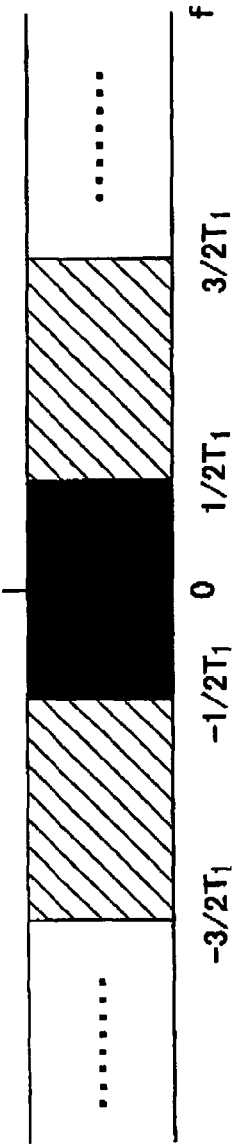
A1 BASEBAND SIGNAL (FREQUENCY SPECTRUM) OF IMPULSE SERIES OF MODULATED SIGNAL (USER 1)
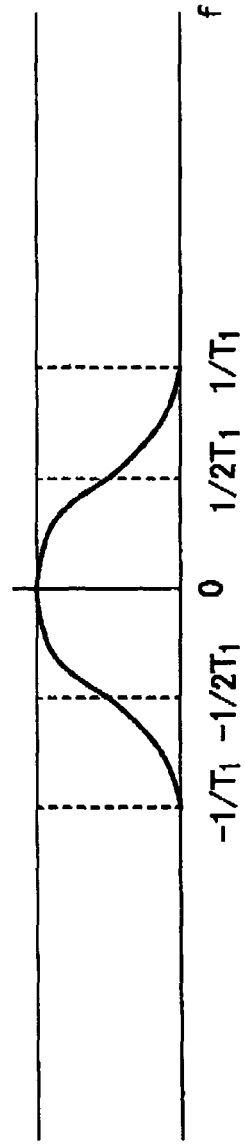
B1 BASEBAND SIGNAL FREQUENCY SPECTRUM BANDPASS-FILTERED BY ROOT-RAISED COSINE FILTER (USER 1)
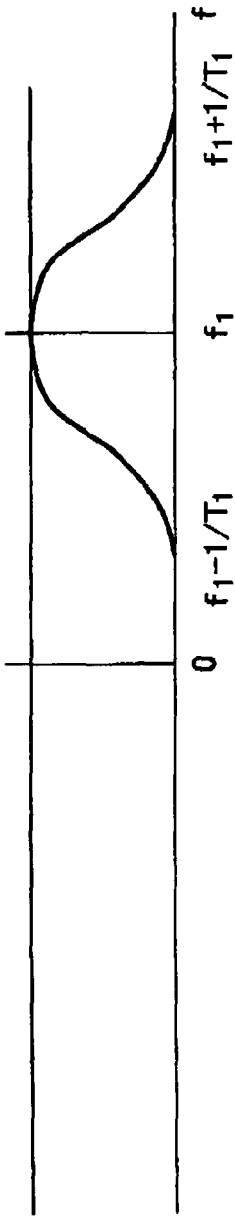
C1 FREQUENCY SPECTRUM OF RF TRANSMISSION SIGNAL (USER 1)

FIG.4
D  RECEIVED SIGNAL
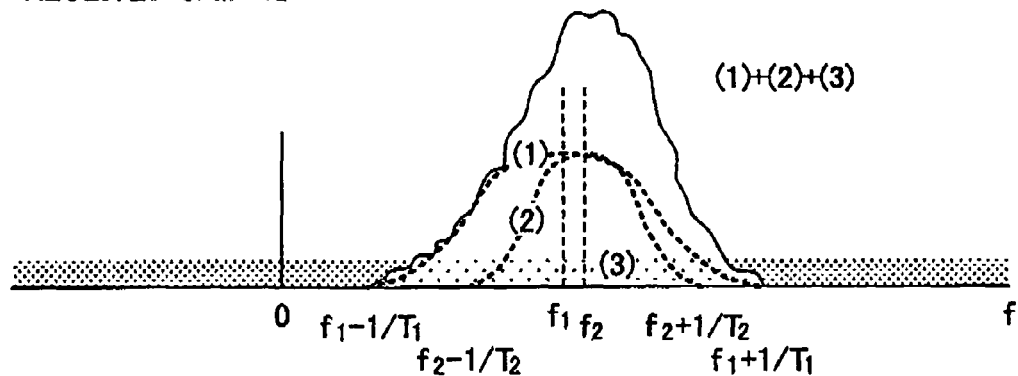
E  RECEIVED SIGNAL AFTER FREQUENCY-CONVERSION FROM RF TO BASEBAND
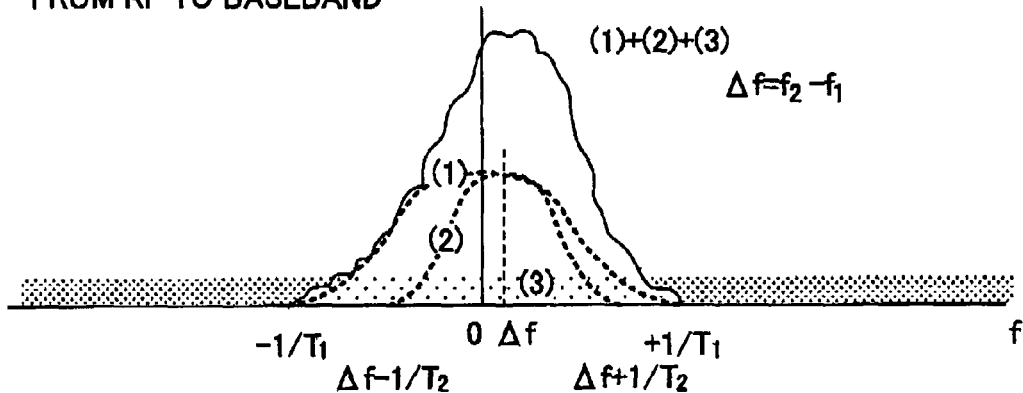
F  RECEIVED SIGNAL AFTER BANDPASS-FILTERED BY USER 1 RECEIVING FILTER
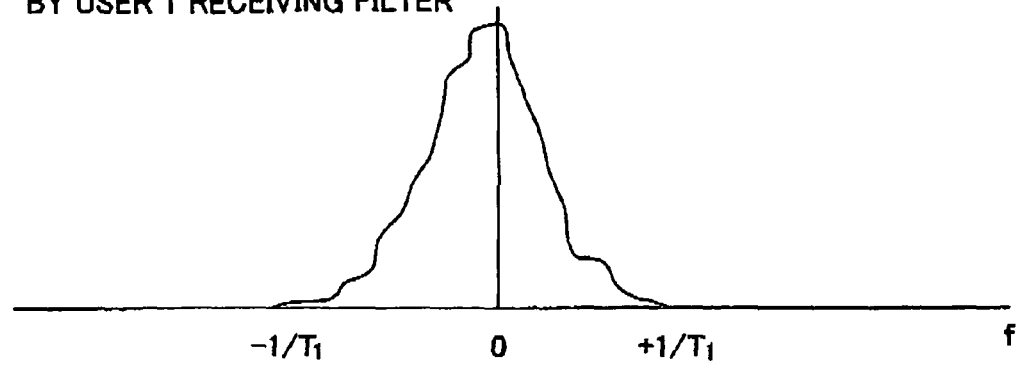

FIG.15

| | DESIRED SIGNAL | INTERFERING SIGNAL |
|---|---|---|
| CARRIER FREQUENCY | $f_1$ | $f_2 = f_1 + 0.5$ |
| SYMBOL RATE | $1/T_1$ | $1/T_2 = 1/2T_1$ |
| NUMBER OF SAMPLES PER SYMBOL | 4 | 8 |
| MODULATION METHOD | BPSK | BPSK |
| DESIRED SIGNAL TO INTERFERING SIGNAL RATIO | 1.0 | 1.0 |
| TRANSMISSION AND RECEIVING SHAPING FILTERS | ROOT RAISED COSINE (ROLL-OFF=1.0 or 0.2) | ROOT RAISED COSINE (ROLL-OFF=1.0 or 0.2) |
| PROPAGATION PATH | AWGN, MULTI-PATH (16 PATHS LINEARLY DECAYS) | AWGN, MULTI-PATH (16 PATHS LINEARLY DECAYS) |

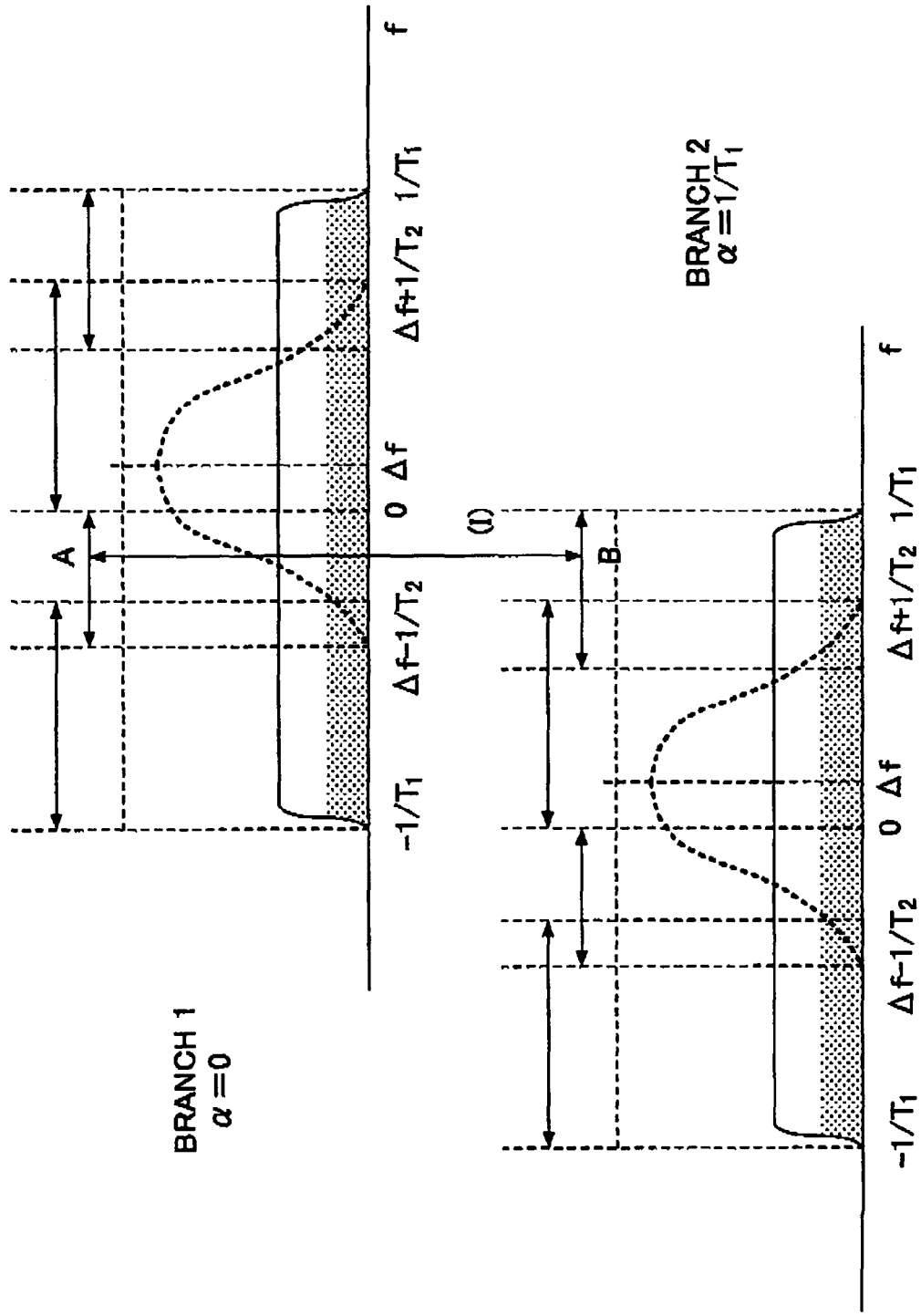

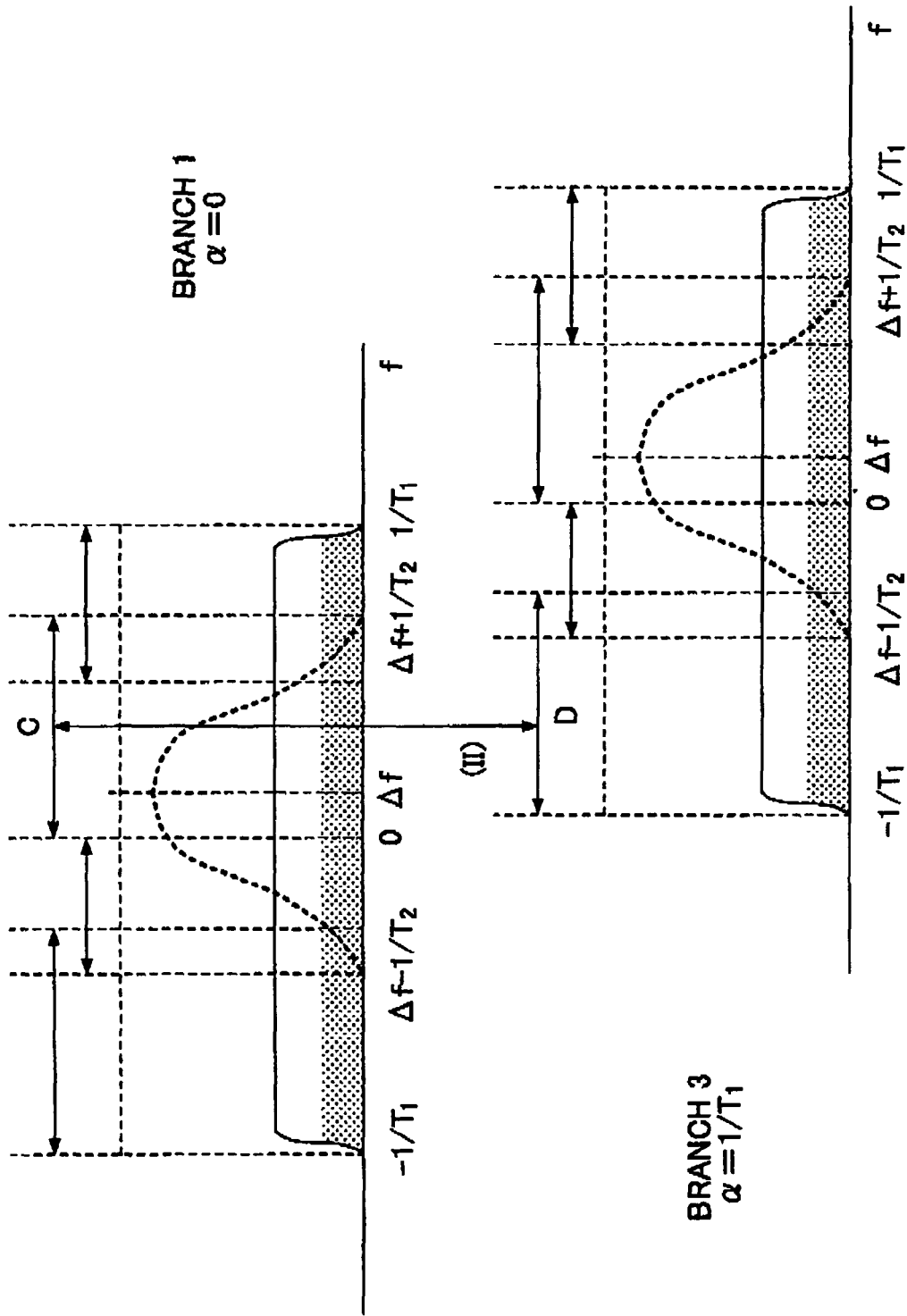

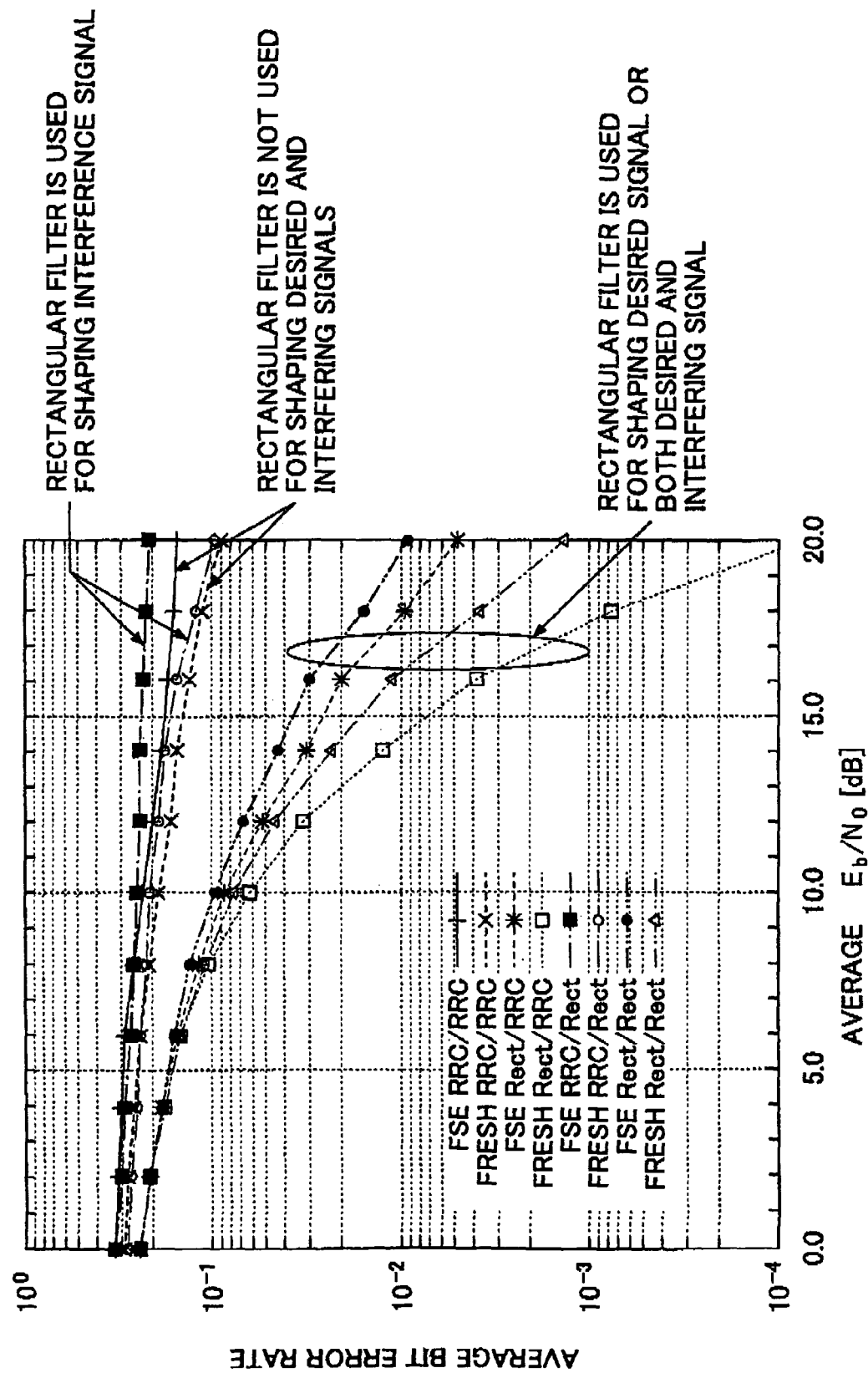

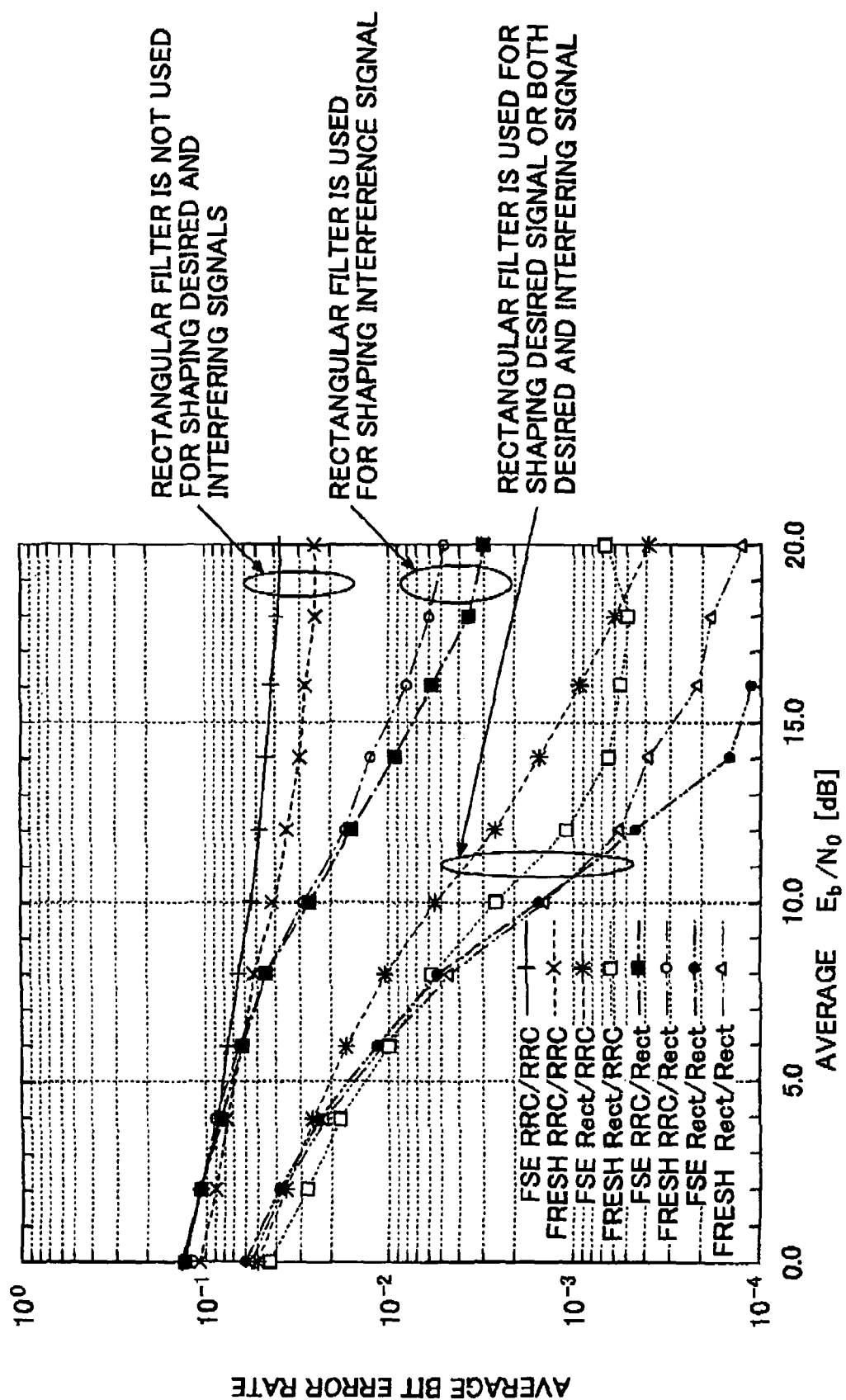

COMMUNICATION DEVICE AND COMMUNICATION METHOD

BACKGROUND OF THE INVENTION

1. Field of the Invention

The present invention generally relates to radio communication, and especially relates to a communication device and method used under a frequency sharing environment where plural communication systems establish communications within the same frequency band.

2. Description of the Related Art

In the prior art radio communication systems, a dedicated frequency band is allocated to each radio communication system so as to avoid interference and maintain signal qualities. However, in order to use frequency resources much more efficiently, a frequency sharing environment is considered, in which plural communication systems share the same frequency bands. In such a frequency sharing environment, it is required that own system suppresses interfering signals from other systems to maintain the signal quality of desired signals for the own system.

FIG. 1 shows an example of two transmitters and a receiver that would be used in such a system. In the example shown in FIG. 1, two transmitters use the same frequency band, but a user 1 and a user 2 utilize different communication systems. A signal transmitted from the user 2 becomes an interfering signal against the user 1. In the prior art radio communication system, a transmission shaping filter 1 in the transmitter for the user 1 and a receiver shaping filter 3 in a receiver for the user 1 make a pair and their filter transfer characteristics are fixed so as to perform suitable band pass limitation.

FIG. 2 shows frequency spectrum charts illustrating a desired signal. A1 represents a baseband signal (frequency spectrum) of impulse series of a modulated signal for user 1. B1 represents a baseband signal frequency spectrum of user 1 that has been bandpass-filtered by a transmission shaping filter (e.g., a root-raised cosine filter). C1 represents a frequency spectrum of an RF transmission signal transmitted from the user 1. The desired signal transmitted by user 1 has a carrier frequency of $f_1$. The desired signal is transmitted with a symbol interval of $T_1$, and thus its Nyquist frequency is $\frac{1}{2}T_1$.

FIG. 3 shows frequency spectrum charts illustrating an undesired (interfering) signal. A2 represents a baseband signal (frequency spectrum) of impulse series of a modulated signal for user 2. B2 represents a baseband signal frequency spectrum of user 2 that has been bandpass-filtered by a transmission shaping filter (e.g., a root-raised cosine filter). C2 represents a frequency spectrum of an RF transmission signal transmitted from the user 2. The undesired (interfering) signal transmitted by user 2 has a carrier frequency of $f_2$. The undesired signal is transmitted with a symbol interval of $T_2$, and thus its Nyquist frequency is $\frac{1}{2}T_2$.

FIG. 4 shows frequency charts illustrating a desired signal. D represents a frequency spectrum of signals received by the receiver for the user 1. The total spectrum (solid line) of the received signal is considered to consist of a desired signal (1), an undesired signal (2) and noise (3). E represents a frequency spectrum of signals converted from RF to baseband. F represents a frequency spectrum of signals after bandpass filtering by a receiver shaping filter 3 in the receiver for the user 1.

FIG. 5 shows frequency charts illustrating a desired signal that has been ideally equalized. G represents the frequency spectrum of a desired signal after being ideally equalized by an adaptive filter in the receiver for the user 1. The signal shown in FIG. 5G is symbol-rate-sampled to repeatedly appear with intervals of 1/T1 in the frequency domain as shown in FIG. 5H. The summation of these frequency spectrum signals yields a restored signal (FIG. 5I) that corresponds to the transmitted signal from the user 1. The signals indicated by A1, B1, C1, . . . in FIGS. 2-5 correspond to signals indicated by the same reference characters in FIG. 1.

One method for cancelling another system's interfering signals in received signals is known, in which Maximum Likelihood Sequence or Linear signal processing is employed to jointly or sequentially process the signals, respectively. These methods, however, require that the desired system grasps the parameters (training symbol, modulation method, symbol rate, etc.) of the interfering system in advance. When such parameters of the interfering system are unknown, it is impossible to effectively cancel the interfering signals.

Another method for cancelling another system's interfering signals in received signals is known, in which the Fractionally Spaced Equalizer (FSE) and the FREquency Shift filtering (FRESH) are employed. FSE and FRESH filtering schemes have the potential to exploit the spectrum redundancy for interference cancellation with no need for interfering system signal's parameters. FIG. 6 schematically shows a frequency shift filter (FRESH). FIG. 7 schematically shows a fractionally spaced equalizer (FSE). The FSE and FRESH can be used as an adaptive filter for the receiver as shown in FIG. 1. As shown in FIG. 6, the FRESH includes a plurality of FSEs connected in parallel, and the outputs of the FSEs are summed. The output after the summation is subtracted from a training signal to generate an error signal. The tap coefficients of all FSE filters are jointly adjusted so as to reduce the error signal. As shown in FIG. 7, the FSE filter includes a series of delay elements, each of which delays an over-sampled input signal. Each output from each of the delay elements is multiplied with a tap coefficient (i.e., weight) $c_i$ and summed (see Non-Patent Documents #1, #2).

[Non-Patent Document #1]

W. A. Gardner, "Exploitation of spectral redundancy" in cyclostationary signals", IEEE Signal Processing Magazine, vol. 8, no. 2, pp. 14-36, April 1991

[Non-Patent Document #2]

W. A. Gardner, "Cyclic Wiener filtering: theory and method", IEEE Trans. Commun., vol. 41, no. 1, pp. 151-163, January 1993

DESCRIPTION OF THE INVENTION

Problem(s) to be Solved by the Invention

In the above prior art, the transmission shaping filter 1 and the receiver shaping filter 3 shown in FIG. 1 make a pair and their shapes and characteristics are fixed when designing the system so as to be matched filters. On the other hand, dynamic compensation such as compensation for channel variations exclusively relies on the adaptive filter at the receiver side. Therefore, when the desired signal is subject to interference a concern is that interference cancellation ability becomes inadequate especially in case of significant interference and when the signal parameters of undesired signals are unknown, non-parametric interference cancellation is needed. Furthermore, the performance of non-parametric interference cancellation based on FSE and FRESH adaptive filters, largely depends on the amount of spectrum redundancy available and/or the carrier frequency separation between the desired and interfering signals.

SUMMARY OF THE INVENTION

The present invention provides a communication device and method used in a first communication system under a frequency sharing environment where a first communication system and a second communication system establish communications within the same frequency band, in which another system's interference can be reduced even without knowing its system's parameters.

Features of the present invention are set forth in the description that follows, and in part will become apparent from the description and the accompanying drawings, or may be learned by practice of the invention according to the teachings provided in the description. Problem solutions provided by the present invention will be realized and attained by a communication device and method particularly pointed out in the specification in such full, clear, concise, and exact terms as to enable a person having ordinary skill in the art to practice the invention.

To achieve these solutions and in accordance with the purpose of the invention, as embodied and broadly described herein, the invention provides a specific communication device and method as follows.

Means for Solving the Problem

An aspect of the present invention provides a communication device used in a first communication system under a frequency sharing environment where a first communication system and a second communication system establish communications within the same frequency band, comprising: a detector for detecting an interfering signal from the second communication system; and a determiner for determining transfer characteristics of a shaping filter according to a result of the detection, the shaping filter being used for a desired signal of the first communication system.

Another aspect of the present invention provides a communication method used in a first communication system under a frequency sharing environment where the first communication system and a second communication system establish communications within the same frequency band, comprising the steps of: detecting an interfering signal from the second communication system; and determining transfer characteristics of a shaping filter according to a result of the detection, the shaping filter being used for a desired signal of the first communication system.

[Advantage of the Invention]

According to embodiments of the present invention, in a communication device and method used in an own communication system under a frequency sharing environment where the own communication system and another communication system establish communications within the same frequency band, the other system's interference can be reduced even without knowing the other system's parameters to reduce degradation of the own system's receiver performance. Interference of the own system on the other system can also be reduced.

BRIEF DESCRIPTION OF THE DRAWINGS

FIG. 2 shows frequency spectrum charts illustrating a desired signal;

FIG. 4 shows frequency charts illustrating a desired signal;

FIG. 15 shows simulation conditions;

FIG. 21 shows two signals before frequency shift filter summing;

FIG. 22 shows two signals before frequency shift filter summing;

FIG. 23 is a chart illustrating simulation results of average bit error rates of an own system signal; and FIG. 24 is a chart illustrating simulation results of average bit error rates of another system signal.

DESCRIPTION OF THE PREFERRED EMBODIMENTS

Figure 1:
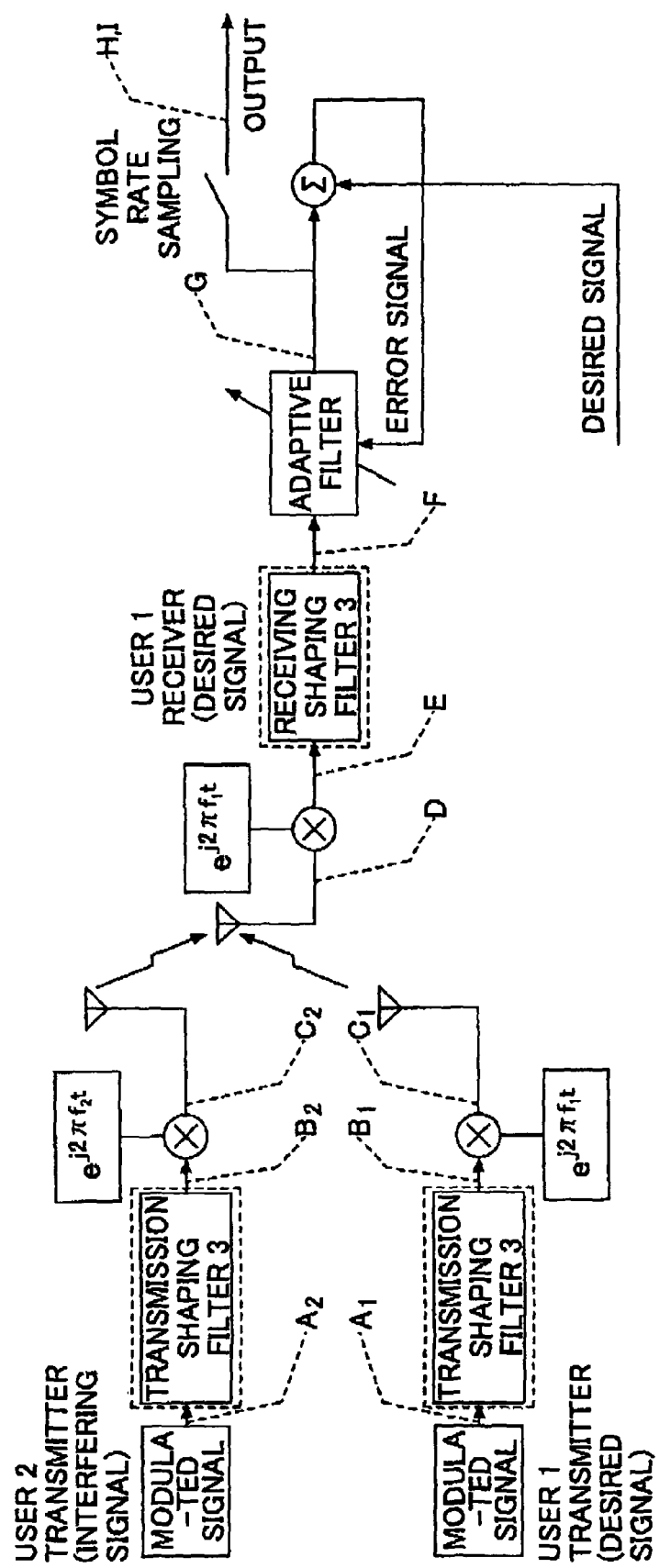
FIG. 1 is a schematic diagram of transmitters and a receiver used in a frequency sharing environment.
Figure 3:
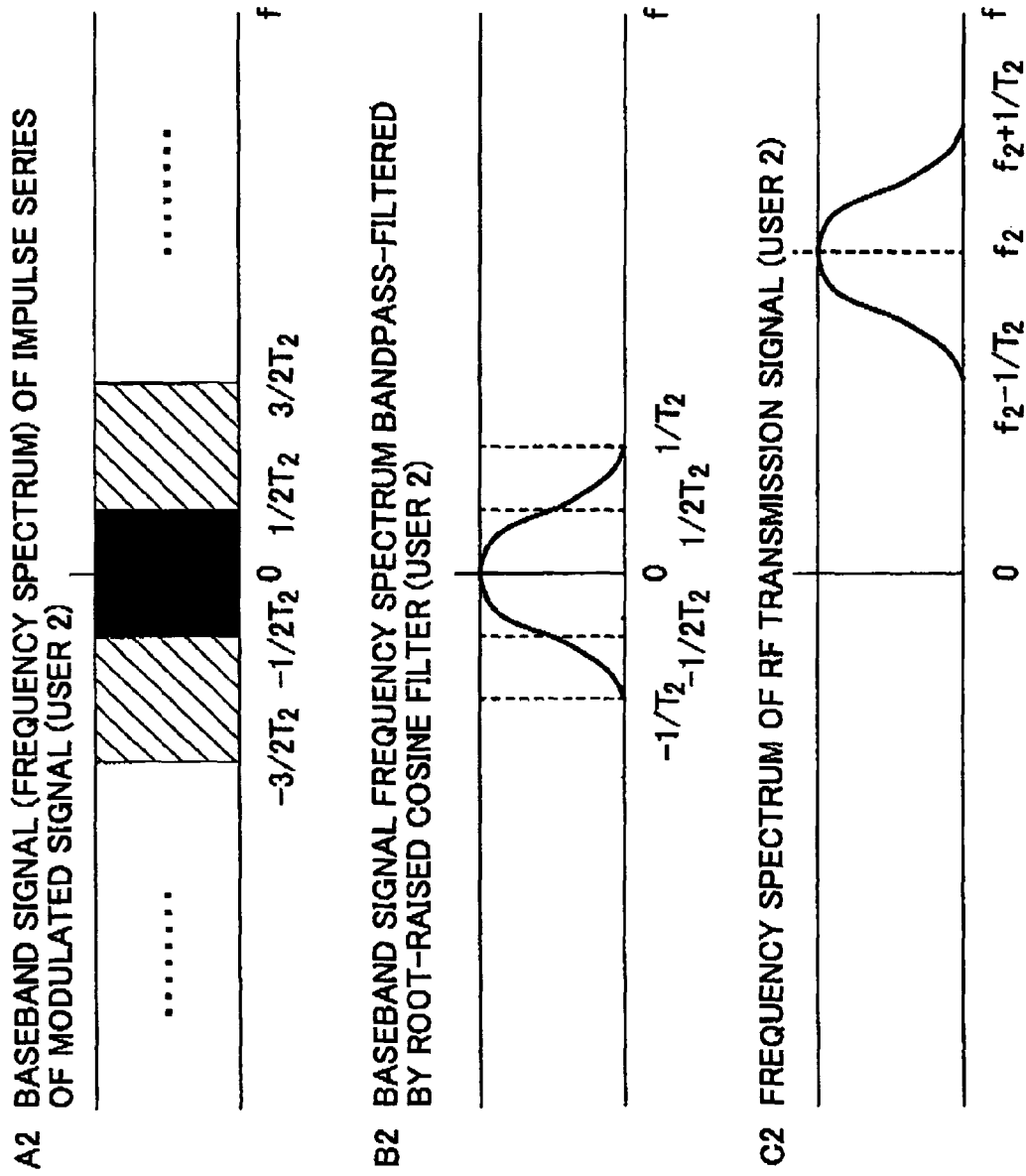
FIG. 3 shows frequency spectrum charts illustrating an undesired (interfering) signal.
Figure 5:
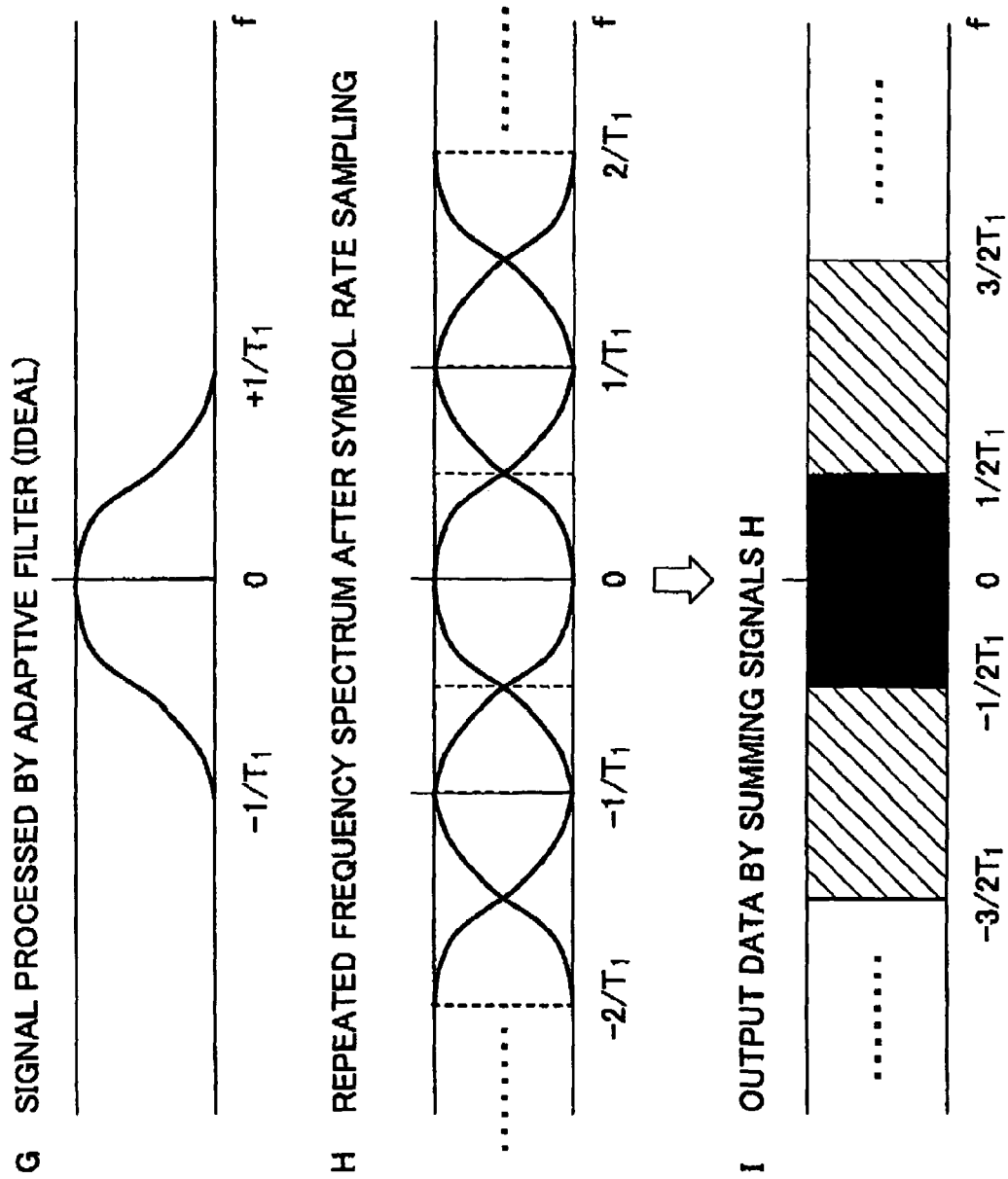
FIG. 5 shows frequency charts illustrating a desired signal that has been ideally equalized.
Figure 6:
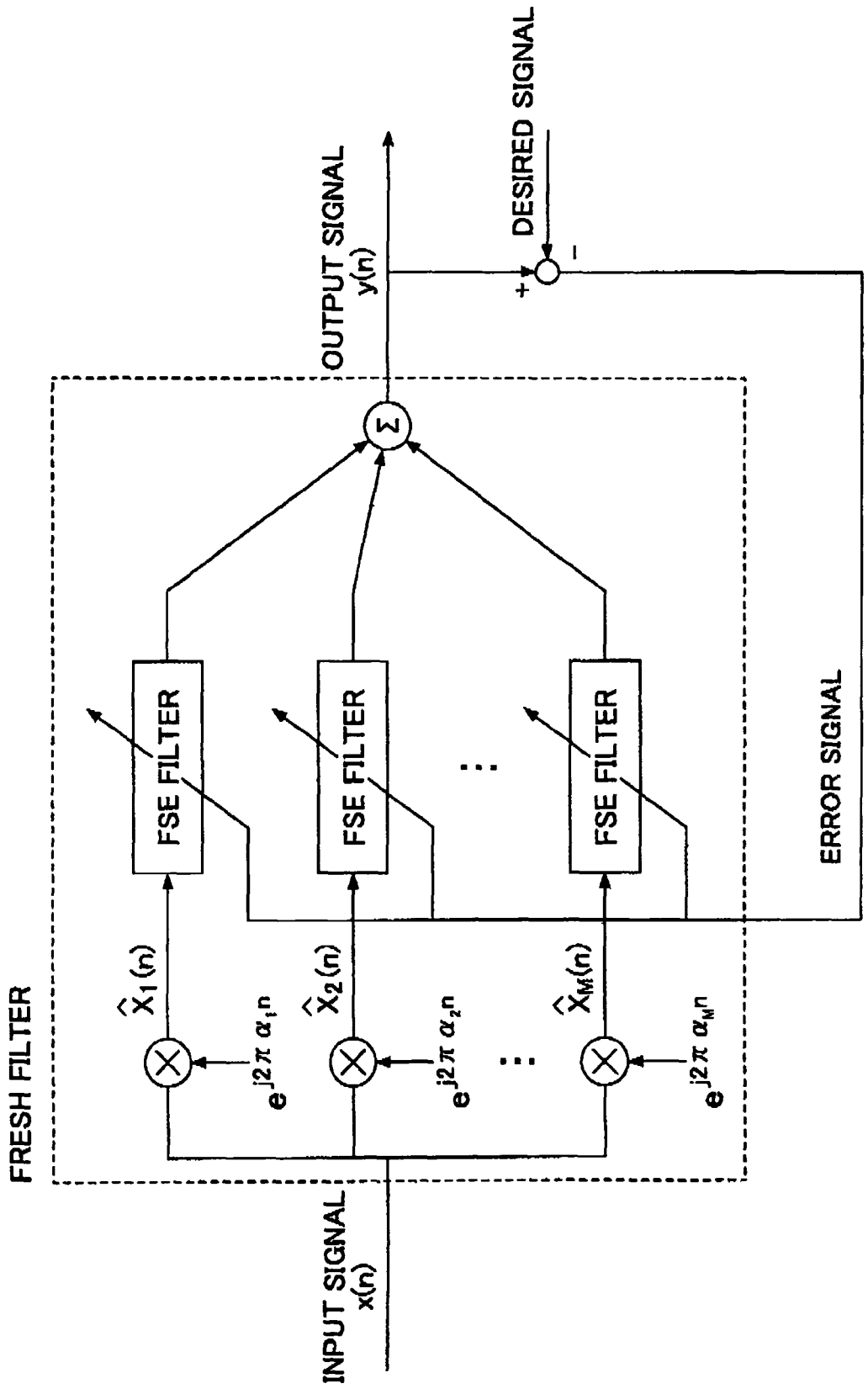
FIG. 6 is a schematic diagram illustrating the principle of a frequency shift filter (FRESH)

In the following, embodiments of the present invention are described with reference to the accompanying drawings, wherein common reference numbers are assigned to items that have the same functions, and the descriptions are not repeated.

According to one embodiment of the present invention, a transmitter's shaping filter and a receiver's shaping filter are adaptively modified depending on interference conditions to maintain interference cancellation capability of the receiver. When the separation between the central carrier frequencies of a desired signal and an undesired signal is large, transfer characteristics of the shaping filters are narrowed in the frequency domain or the symbol rate is lowered to reduce the signal's spectral redundancy and narrow the signal band pass, and therefore avoid interference. The filters used for communication may be a low pass filter that has odd-symmetric (i.e., anti-symmetric) transfer characteristics with respect to the Nyquist frequency. A raised cosine filter having a changeable roll-off rate can also be used. The desired signal and the undesired signal can be properly separated by decreasing the roll-off rate.

On the other hand, when the separation between the central carrier frequencies of the desired signal and the undesired signal is small, the shaping filter's transfer characteristics in the frequency region beyond the Nyquist frequency are made larger in order to increase spectrum redundancy such that an effective suppression of interfering signals can be made.

The transmission and receiving shaping filters may have amplitude characteristics larger than that of a roll-off filter in the frequency range beyond the Nyquist frequency. Such a shaping filter may be a low pass filter, preferably a rectangular filter having a passband that is more than twice the Nyquist frequency.

To exploit the spectrum redundancy induced by the pulse shaping filters for non-parametric interference cancellation at the receiver side, FSE or FRESH filter can be used as an adaptive filter. For the FRESH filter a plurality of adaptive filters, the center frequencies of which have different transfer characteristics, and an adjuster for adaptively adjusting the coefficients of one or more adaptive filters based on outputs from the plural filters and a known signal. The central frequencies of the plural filters may be separated from a reference adaptive filter (medium branch) by twice the Nyquist frequency (i.e., cyclic frequency). Outputs of filters in which phases are shifted by the cyclic frequency have large correlation with each other. Adaptively updating the filter coefficients so as to increase such correlation (so as to decrease differences from the known signal), makes it possible to obtain an interference-suppressed received signal. Irrespective of whether the central frequencies are large or small, good signal separation characteristics can be maintained and frequency utilization efficiency is improved under the frequency sharing environment where the plural communication systems share the same frequency band.

First Embodiment

Figure 8:
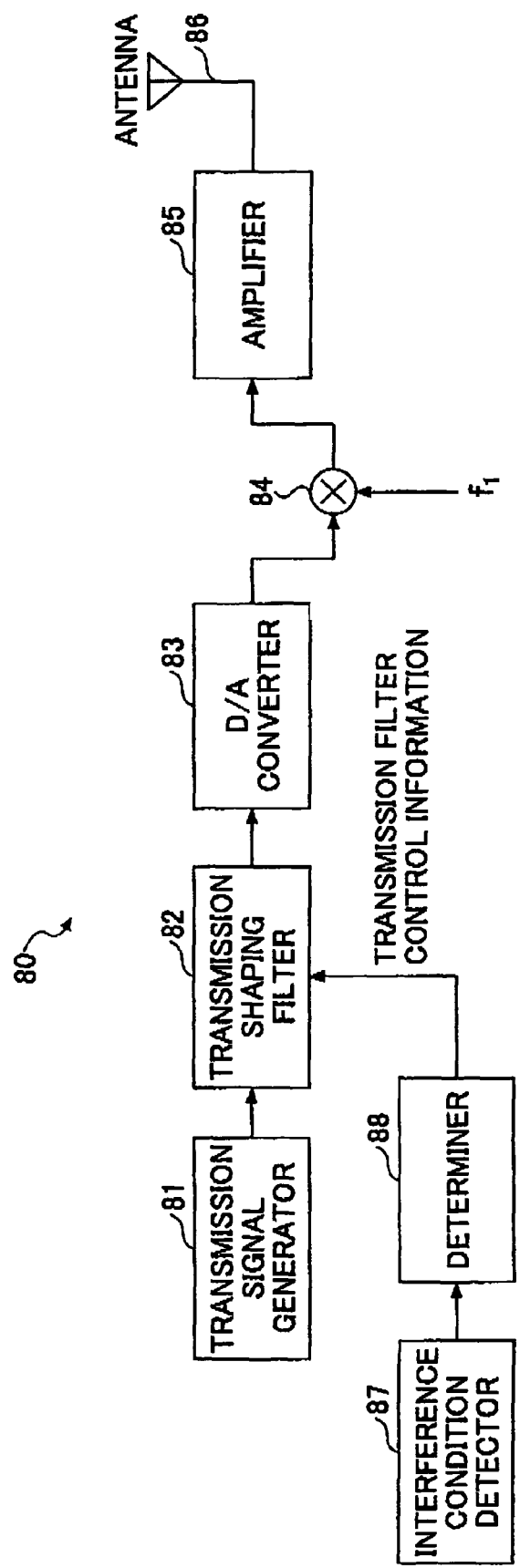
FIG. 8 is a block diagram illustrating a transmitter according to an embodiment of the present invention.

FIG. 8 shows a block diagram illustrating a transmitter according to an embodiment of the present invention. The transmitter 80 includes a transmission signal generator 81, a transmission shaping filter 82, a digital-to-analog (D/A) converter 83, an amplifier 85, an antenna 86, an interference condition detector 87 and a determiner 88. The transmission signal generator 81 generates a baseband transmission signal as shown in FIG. 2A. The transmission shaping filter 82 band-pass-filters the transmission signal. The transfer characteristics of this shaping filter 82 are properly set according to control information. The D/A converter 83 converts the baseband digital signal to an analog signal. The mixer 84 frequency-converts the analog signal with carrier frequency $f_1$ of a desired signal. The amplifier 85 amplifies power of the frequency converted signal so as to transmit it from the antenna 86. The interference condition detector 87 detects parameters (such as frequency, power, etc.) of an interference (undesired) signal from another system. In order to detect them, a received signal is used to estimate conditions of an interference signal. When the transmitter 80 is connected to a transmitter of an interfering second system via a wired network, detection can be performed by receiving control signals from the interfering transmitter. The determiner 88 determines transfer characteristics of the filter 82 based on the detected results. In this embodiment, the first system and the second system sharing the same frequency band communicate with each other so as to adjust their shaping filters to prevent interference. The transmission shaping filter 82 and a receiver shaping filter (not shown) in a receiver side make a pair to band-pass-filter the signal to be transmitted and received.

Figure 9:
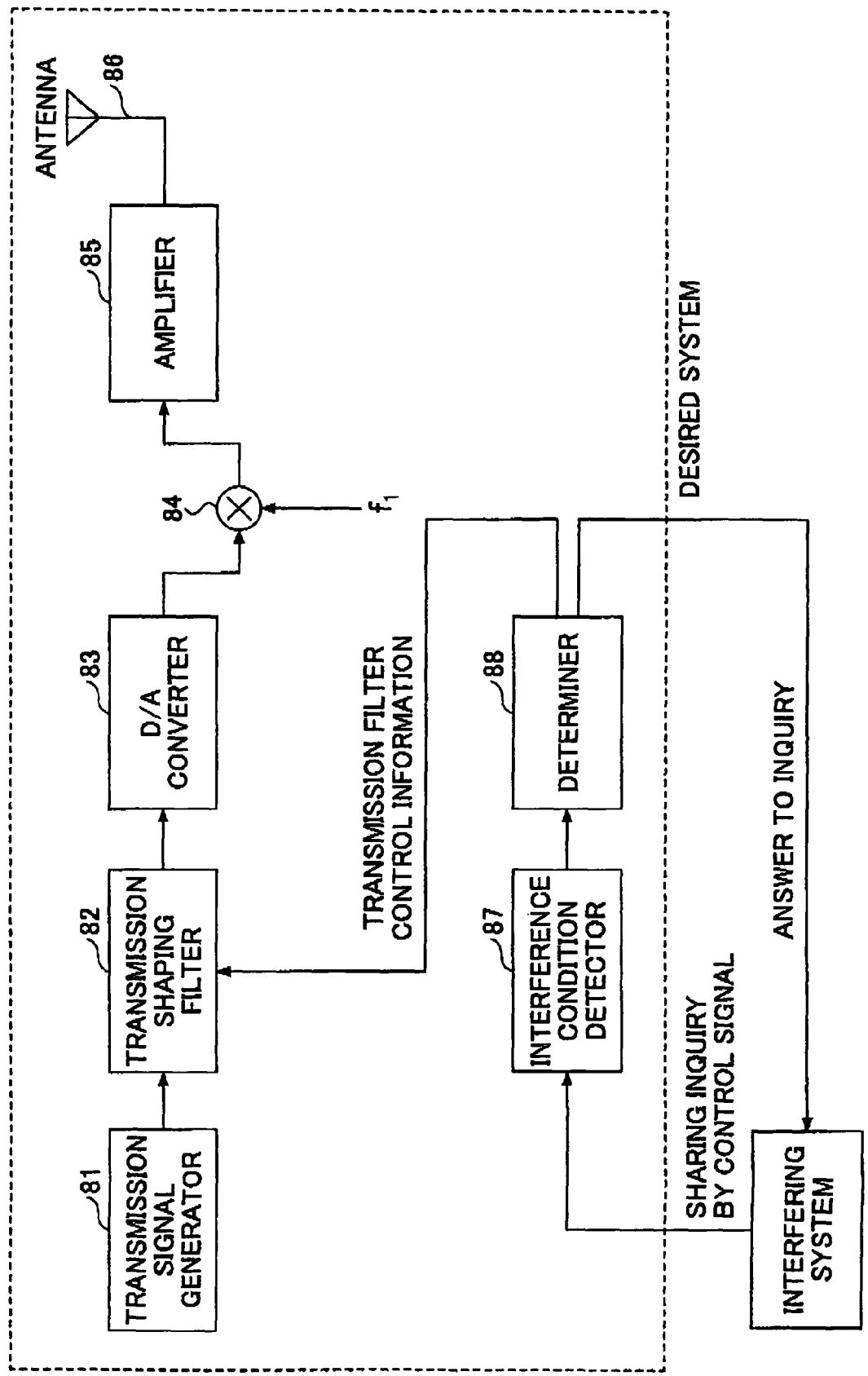
FIG. 9 is a block diagram similar to FIG. 8, illustrating that own system and another system are exchanging information with each other.
Figure 10:
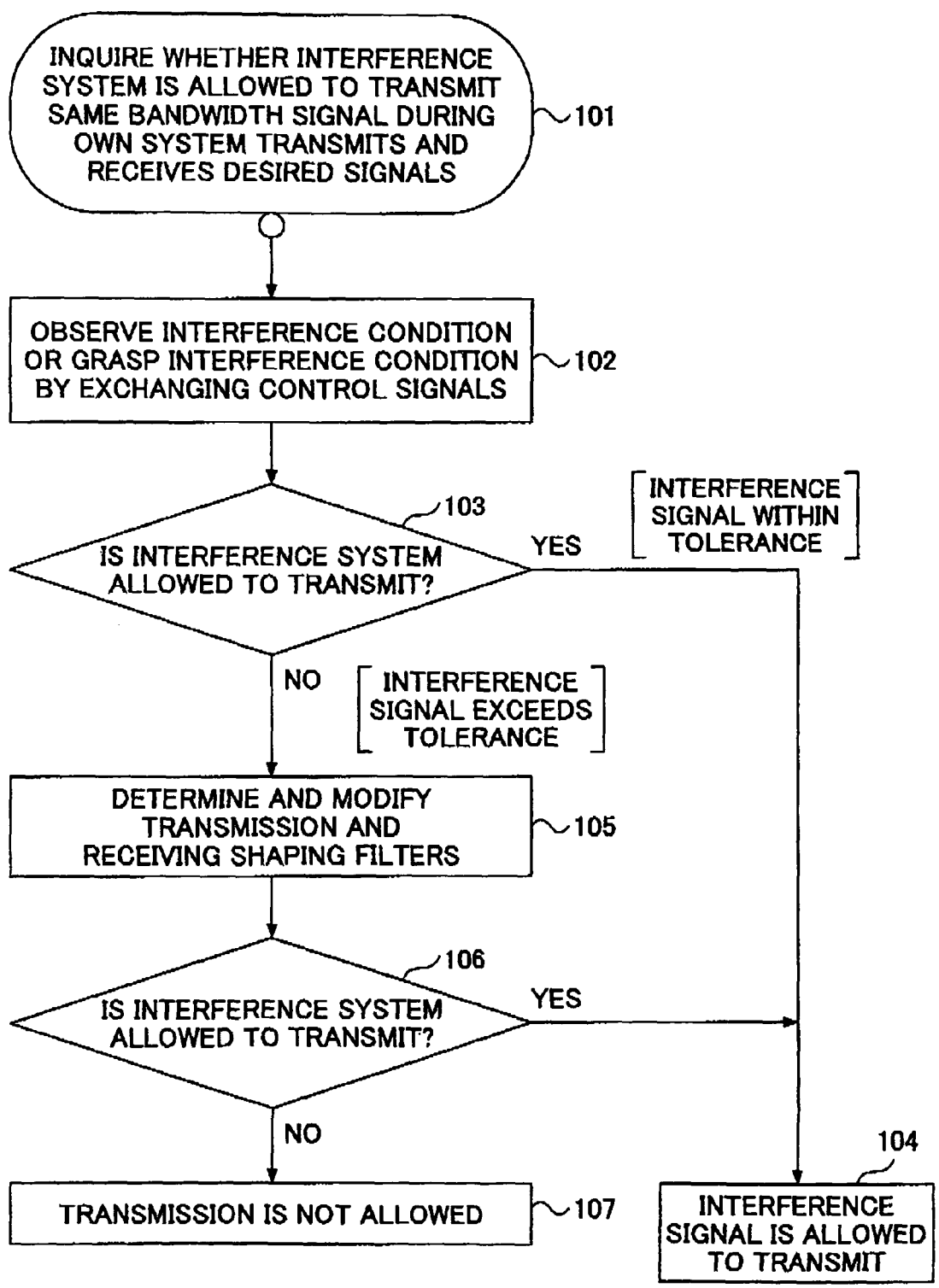
FIG. 10 is a flowchart illustrating a transmitter procedure according to the embodiment of the present invention.

Operations are explained with reference to FIGS. 9 and 10. FIG. 9 illustrates how to determine transfer characteristics of the transmission shaping filter 82, based on communication between the first system and the second system. FIG. 10 is a flowchart illustrating an example of operational procedure within the transmitter 80.

At step 101, the second system inquires the first system whether the second system is allowed to transmit at the same time. Of course, the first system can ask the same question to the second system. For the purpose of convenience, the first system is a desired system and the second system is an interfering system. This inquiry can be sent via any kind of control channel between systems.

At step 102, the interference condition detector 87 detects interference conditions. For example, the interference condition detector 87 stops the first system signal transmission and the second system transmits a signal temporarily, the interference condition detector 87 receives the second system's signal and measures signal strength and frequencies, etc. thereof.

At step 103, the determiner 88 determines whether the second system is allowed to transmit signals at the same time as the first system transmission. For example, when the signal strength of the received signal from the interfering system is smaller than a predetermined value, or the separation between the central frequencies of the desired and interfering systems is larger than a predetermined value, it is expected that no large interference will occur between both the systems even if they transmit signals simultaneously. In this case, the procedure goes to step 104, where the desired system sends a notice to the interfering system that the simultaneous transmission is allowed.

On the other hand, when the signal strength of the received signal from the interfering system is larger than the predetermined value or the separation between the central frequencies of the desired and interfering systems is smaller than the predetermined value, large interference between the systems may occur if both the systems transmit signals simultaneously. In this case, the procedure goes to step 105.

At step 105, the transfer characteristics (e.g., filter shape) of the shaping filter 82 to be used for transmission are adjusted. Alternatively, a shaping filter having suitable transfer characteristics is selected. Concrete filter shapes are explained later.

At step 106, after the filter adjustment at step 105, it is determined whether the second system is allowed to transmit simultaneously. If it is determined that the second system is allowed to transmit, the procedure goes to step 104, and signal communication starts by using a modified filter shape. If the simultaneous signal transmission is still not allowed, the procedure goes to step 107.

At step 107, the determiner 88 sends a notice to the other interfering system that it is not allowed to transmit simultaneously. In this case, the interfering system gives up simultaneous transmission. The interfering system can transmit in a different time slot. Alternatively, the desired system can give up signal transmission. As a criterion for determining whether to give up or not, the priority between the systems can be considered.

Second Embodiment

In a case where large interference occurs between the first and second systems when they simultaneously transmit signals, the transfer characteristics of the shaping filter 82 are properly adjusted. Signal band-pass-filtering is performed by the transmission shaping filter and a receiver shaping filter as a pair. Accordingly, a receiver shaping filter corresponding to the transmission shaping filter 82 is provided in the receiver side, not shown. The transfer characteristics of the receiver shaping filter can also be adjusted.

In the second embodiment, one example of adjustment of the transfer characteristics of the shaping filter is explained. In the explanation below, it is assumed that the center carrier frequencies of the desired system and the interfering system are measured, and their difference is large. It is also assumed that the transmission shaping filter 82 and the shaping receiver filter are root raised cosine filters that can modify their roll-off rates.

Figure 11:
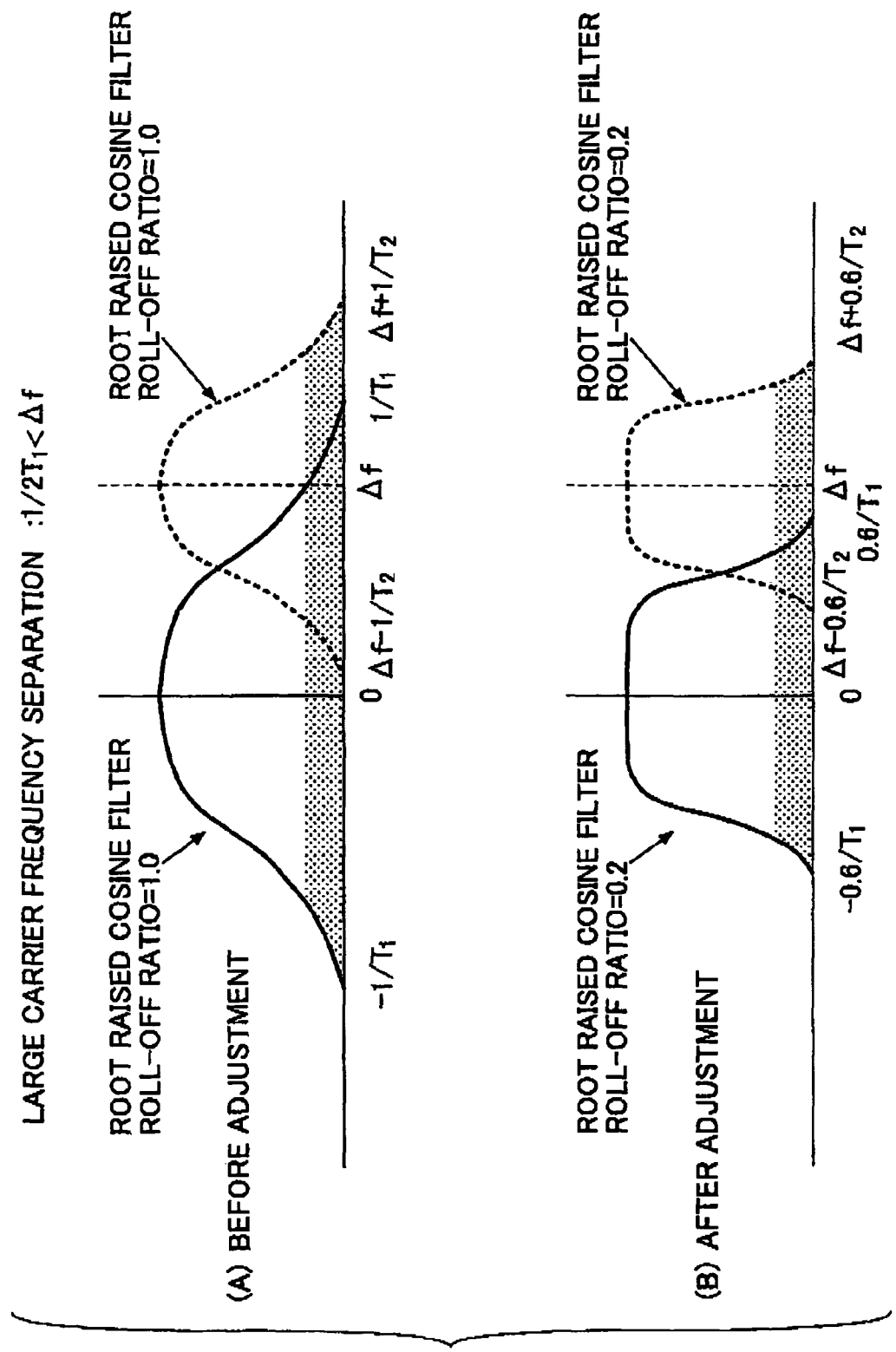
FIG. 11 shows frequency spectrum charts illustrating a desired signal and an interfering signal.

FIG. 11 shows typical frequency spectra of the desired signal and the interfering signal after passing the shaping filters. It is assumed that the roll-off rates of the filters used in the desired and interfering systems are both 1.0 before adjustment. Therefore, the filters have transfer characteristics twice the Nyquist frequencies. The transmission interval of the desired system is $T_1$, and the shaping filter in the desired system has a bandwidth of $2 \times 1/T_1 = 2/T_1$. The transmission interval of the interfering system is $T_2$, and the shaping filter in the interfering system has a bandwidth of $2 \times 1/T_2 = 2/T_2$. The separation between their carrier frequencies is $\Delta f$. In this case, when both the systems transmit signals simultaneously, the receiver receives both the signals, which overlap on the frequency axis as shown in FIG. 11(A). This kind of condition is grasped by the interference condition detector 87 and the determiner 88 shown in FIG. 9 at steps 102 and 103 shown in FIG. 10.

Figure 12:
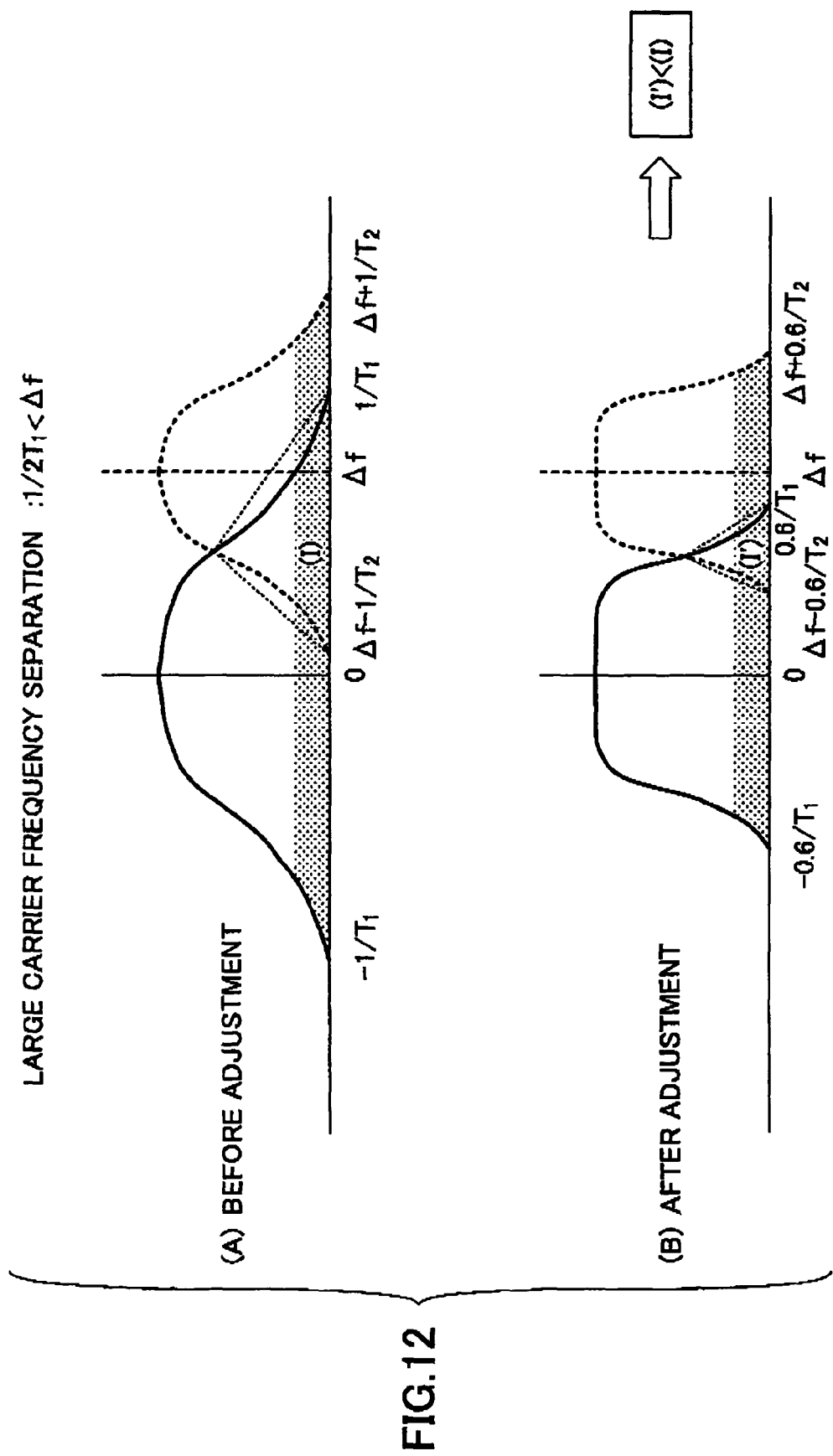
FIG. 12 shows frequency spectrum charts illustrating a desired signal and an interfering signal.

FIG. 12 illustrates the principle of estimating an amount of interference. The shapes of frequency spectra shown in FIG. 12 are the same as those shown in FIG. 11. The amount of interference is evaluated by an overlapped area, which is approximated by a triangle (I) of broken lines in FIG. 12(A). When the triangle area (I) is larger than a predetermined value, the interference is considered to be beyond tolerance. In this case, this embodiment makes the roll-off rates of the filters smaller. In the example shown in FIGS. 11 and 12, the roll-off rates are both changed to 0.2. FIG. 11(B) shows the signal spectra that have passed the filters with the changed roll-off rates. The shaping filters used for communication in the first and second systems have transfer characteristics of 1.2/T_1 and 1.2/T2, respectively. The amount of interference is evaluated by an area of a triangle (I') shown in FIG. 12(B). By changing the roll-off rates of the shaping filters, the area of the triangle is changed from (I) to (I'), which shows the reduction of the amount of interference.

Figure 13:
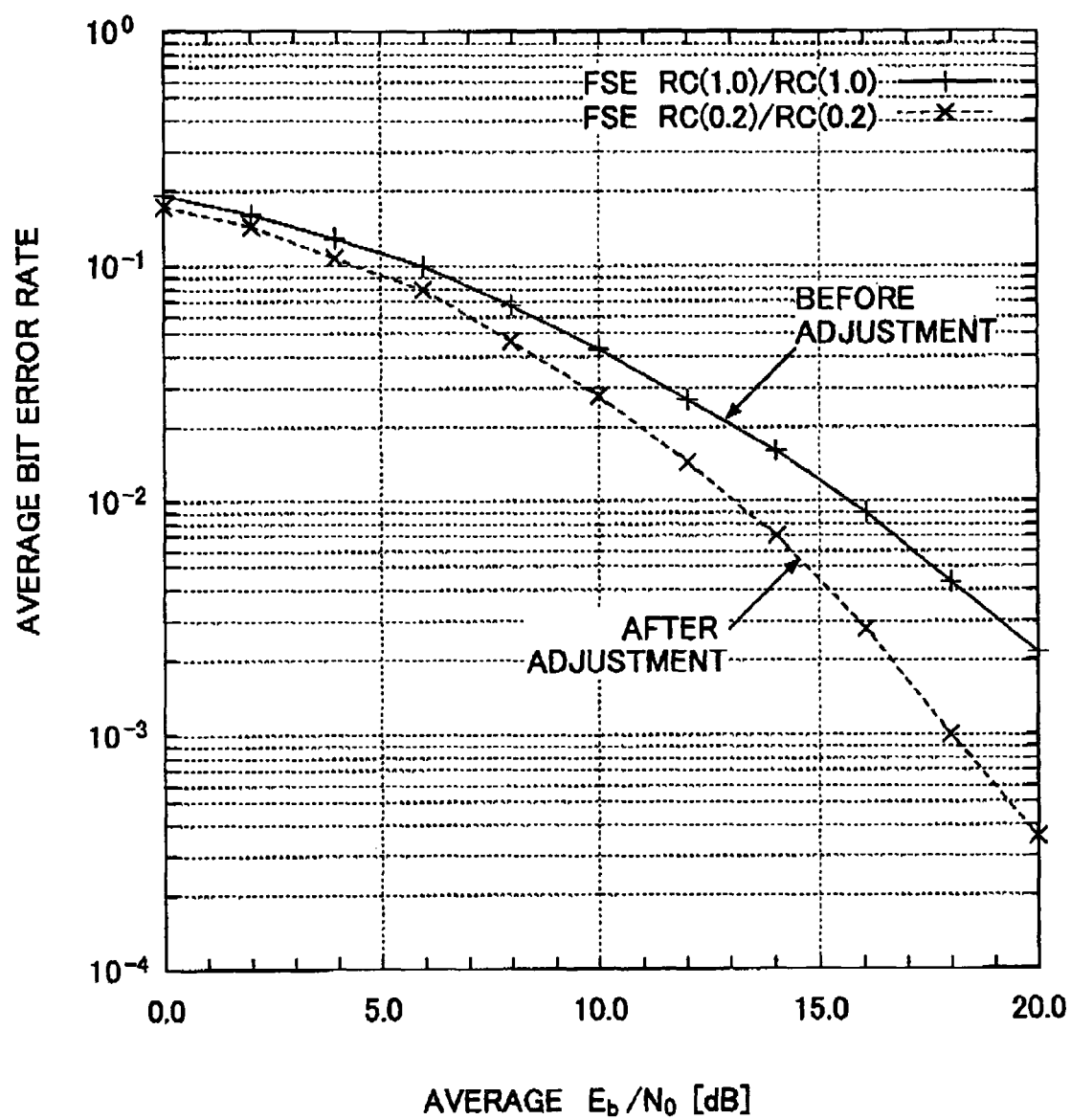
FIG. 13 is a chart illustrating simulation results of average bit error rates of the first system.
Figure 14:
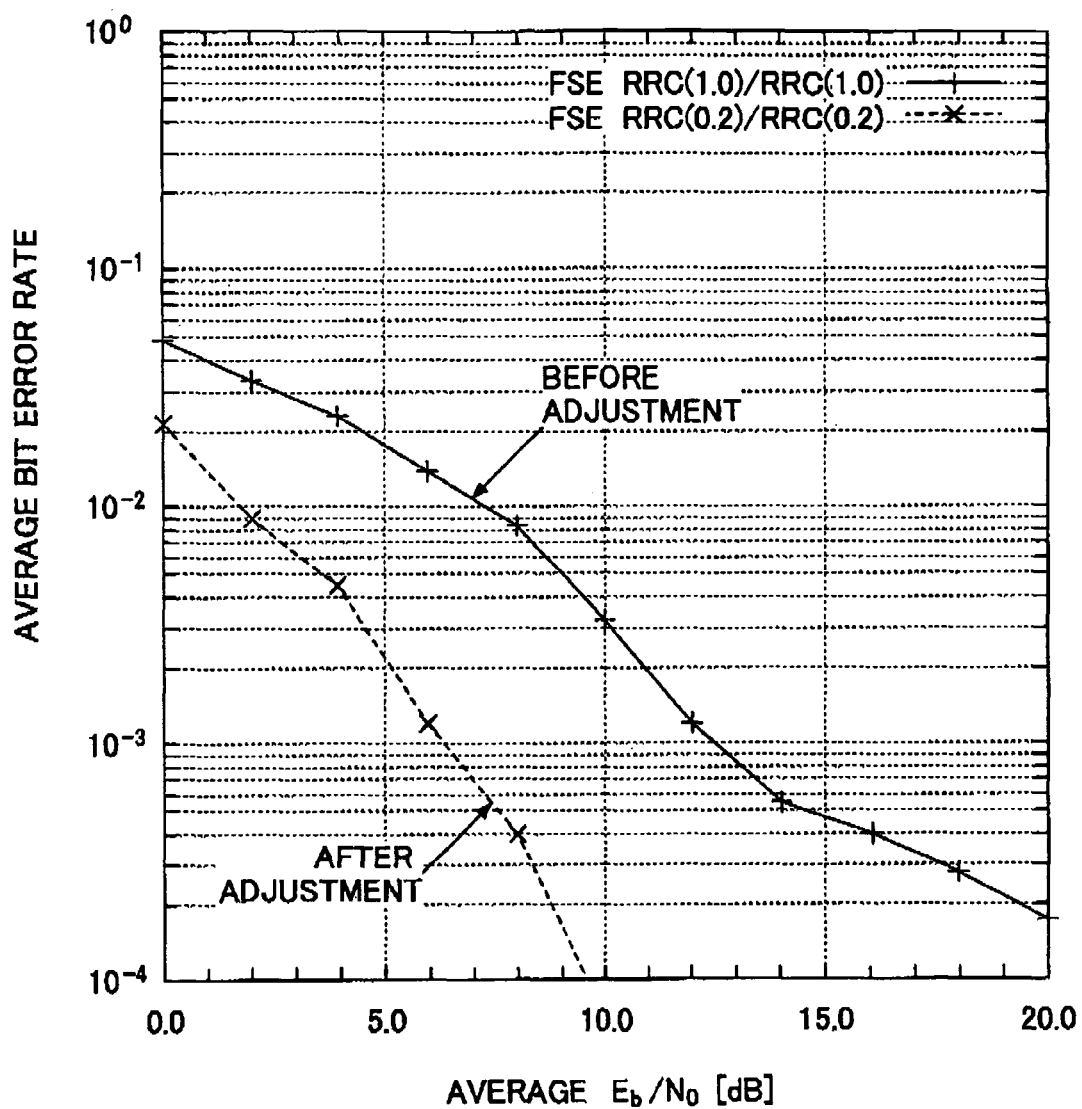
FIG. 14 is a chart illustrating simulation results of average bit error rates of the second system.

FIG. 13 illustrates simulation results of average bit error rates (BER) of the first system signal before and after the change of the roll-off rates of the shaping filters. FIG. 14 illustrates simulation results of average bit error rates (BER) of the interfering signal before and after the change of the roll-off rates of the filters. The conditions of simulations shown in FIGS. 13 and 14 are shown in FIG. 15. FIGS. 11 and 12 show that the interference can be suppressed to obtain good average bit error rates (BER) by making the roll-off rates of the filters smaller for the same $E_b/N_o$ value.

Third Embodiment

Figure 7:
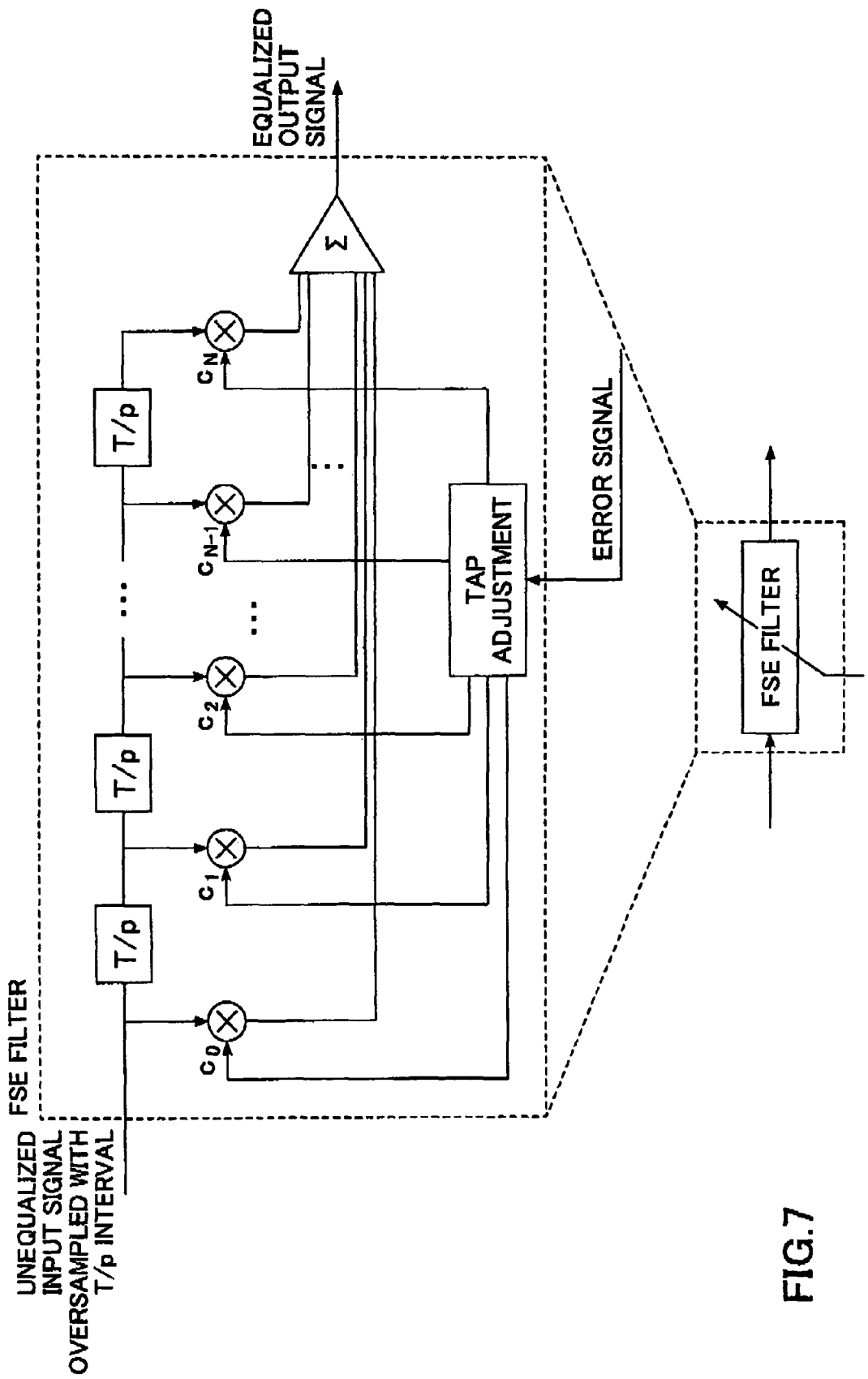
FIG. 7 is a schematic diagram illustrating the principle of a fractionally spaced equalizer (FSE)
Figure 16:
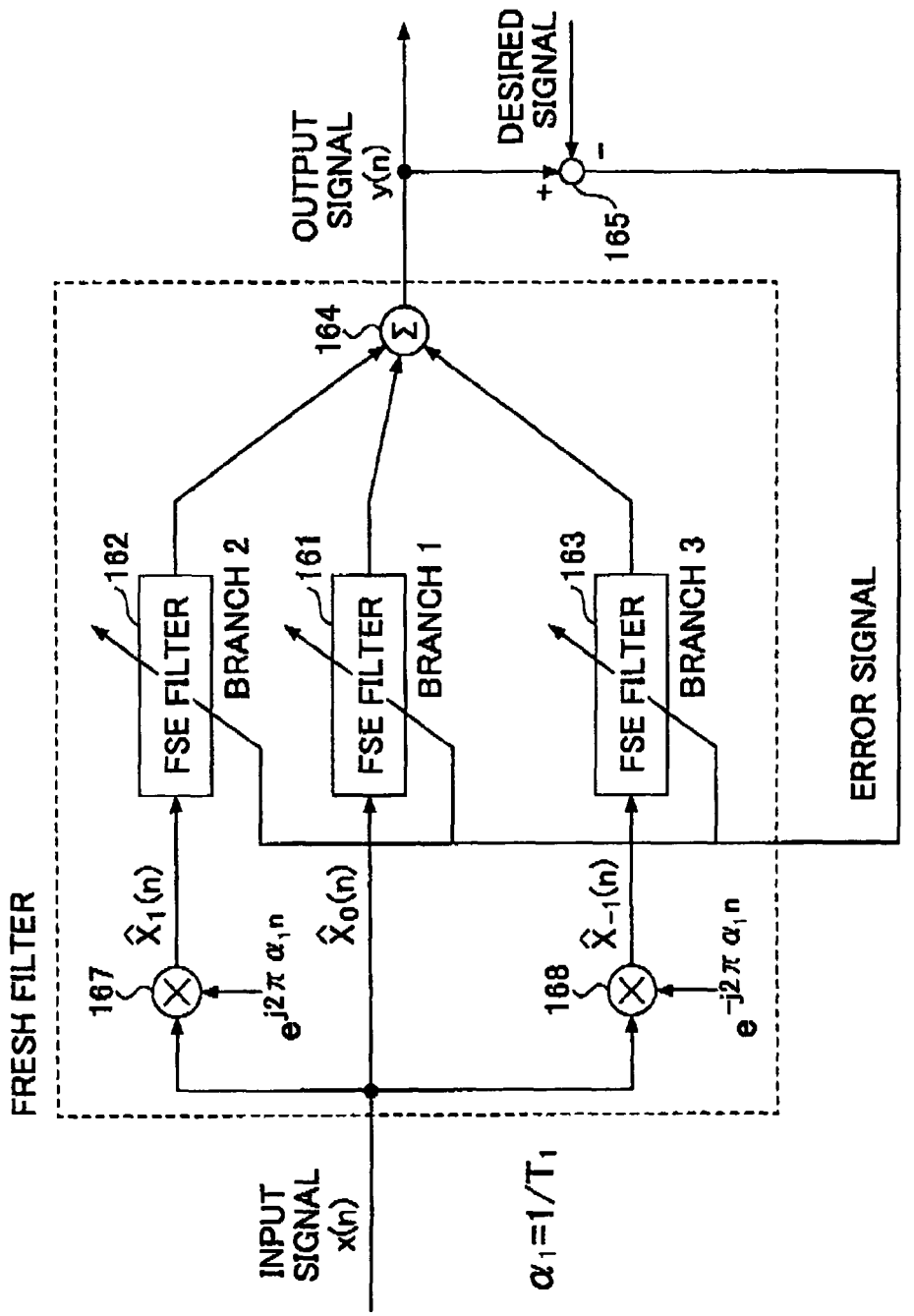
FIG. 16 is a schematic diagram illustrating a frequency shift filter.

In a case where large interferences occur when the first and second systems simultaneously transmit in the same frequency band, the transfer characteristics of the shaping filter 82 is properly adjusted. Band-pass-filtering is performed by a pair of the transmission shaping filter and the receiver shaping filter. The transfer characteristics of the receiver shaping filter may also be adjusted. In this third embodiment, a frequency shift filter is used as an adaptive filter shown in FIG. 1 to cancel interference when the adjustment of the transfer characteristics of the transmission shaping filter and the receiver shaping filter is not enough to realize adequate cancellation reduction. In the explanation below, it is assumed that the difference (separation) between the central carrier frequencies of the desired and interfering systems is smaller than a predetermined value. The difference is measured at step 102 in FIG. 10. A frequency shift filter used in the receiver as an adaptive filter is shown in FIG. 16. The frequency shift filter has three branches, summing unit 164 for summing (combining) signals from all branches, and an error signal generator 165. The error signal generator 165 outputs the difference between the output from the summing unit 164 and the desired signal (for example, training signal). The branches 1, 2 and 3 are provided with FSE filters 161, 162 and 163, respectively. The branches 2 and 3 are further provided with phase adjusters 167 and 168, respectively, which adjust a phase rotation amount. Each of the FSE filters 161, 162 and 163 has functions and structure as shown in FIG. 7. The phase adjuster 167 provided in the branch 2 shifts the center frequency of an input signal x(t) to the plus (positive) direction by twice the Nyquist frequency (i.e., $+1/T_1$). The phase adjuster 168 provided in the branch 3 shifts the center frequency of an input signal x(t) to the minus (negative) direction by twice the Nyquist frequency (i.e., $-1/T_1$).

Figure 17:
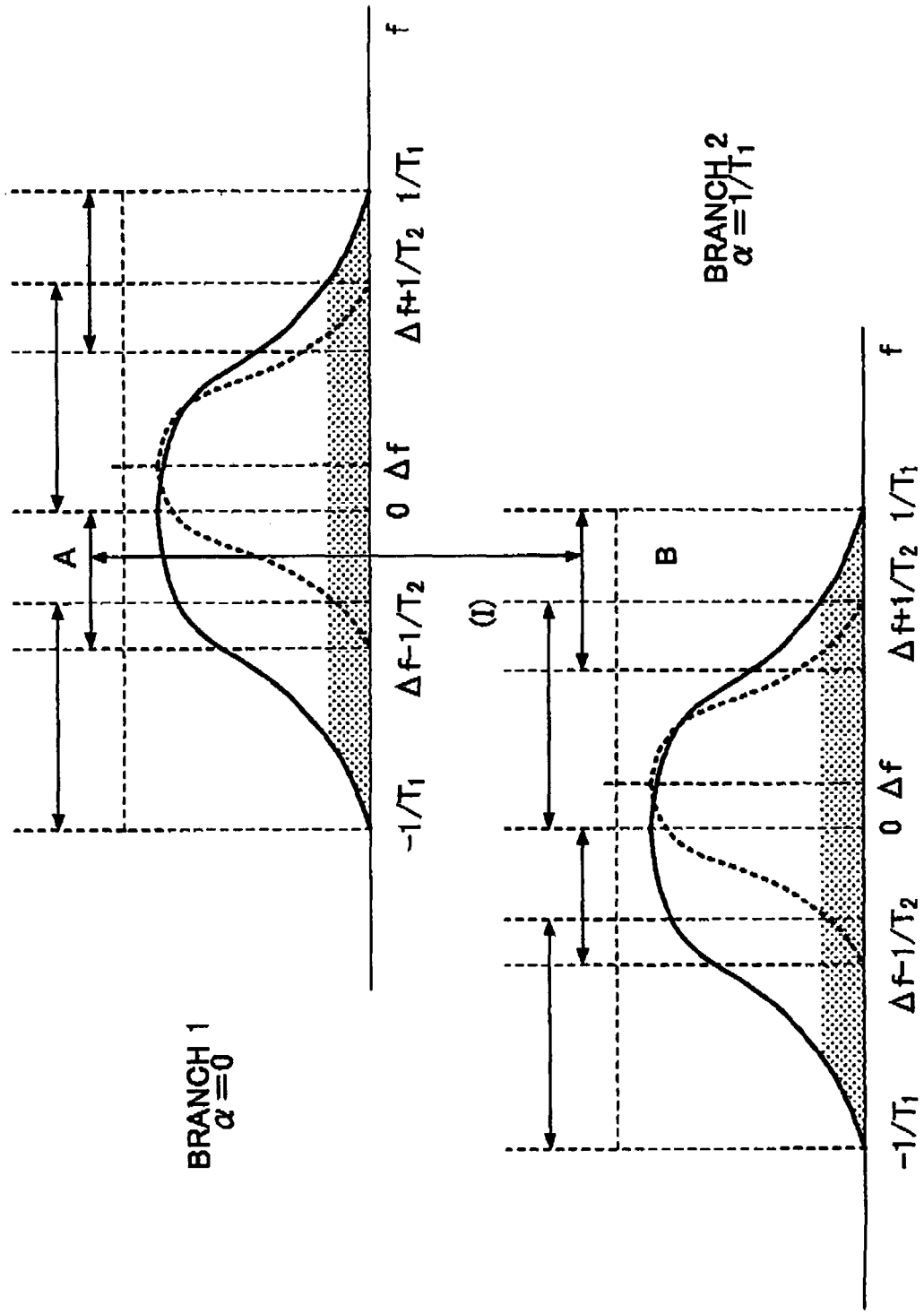
FIG. 17 shows two signals before frequency shift filter summing.

FIG. 17 shows the signal spectrum appearing in the branches 1 and 2 before summing by the summing unit 164. A solid line wave shape represents a desired signal, and a broken line wave shape represents an interfering signal. In this embodiment, since the carrier frequency separation $\Delta f$ is smaller than a predetermined value, the method explained in the second embodiment does not cancel the interference well enough. The phase adjuster 167 in the branch 2 shifts the central frequency of the input signal x(t) by $1/T_1$. Therefore, the signal spectrum appearing in the branch 2 is shifted in the frequency axis by $1/T_1$ as shown in a lower chart of FIG. 17. These signals shifted by $1/T_1$ have large correlation due to digital filter characteristics ($1/T_1$ is a cyclic frequency for the desired signal). Therefore, the sum of the signals from the FSE filters 161, 162 becomes a large signal if the interfering signal does not exist.

Figure 18:
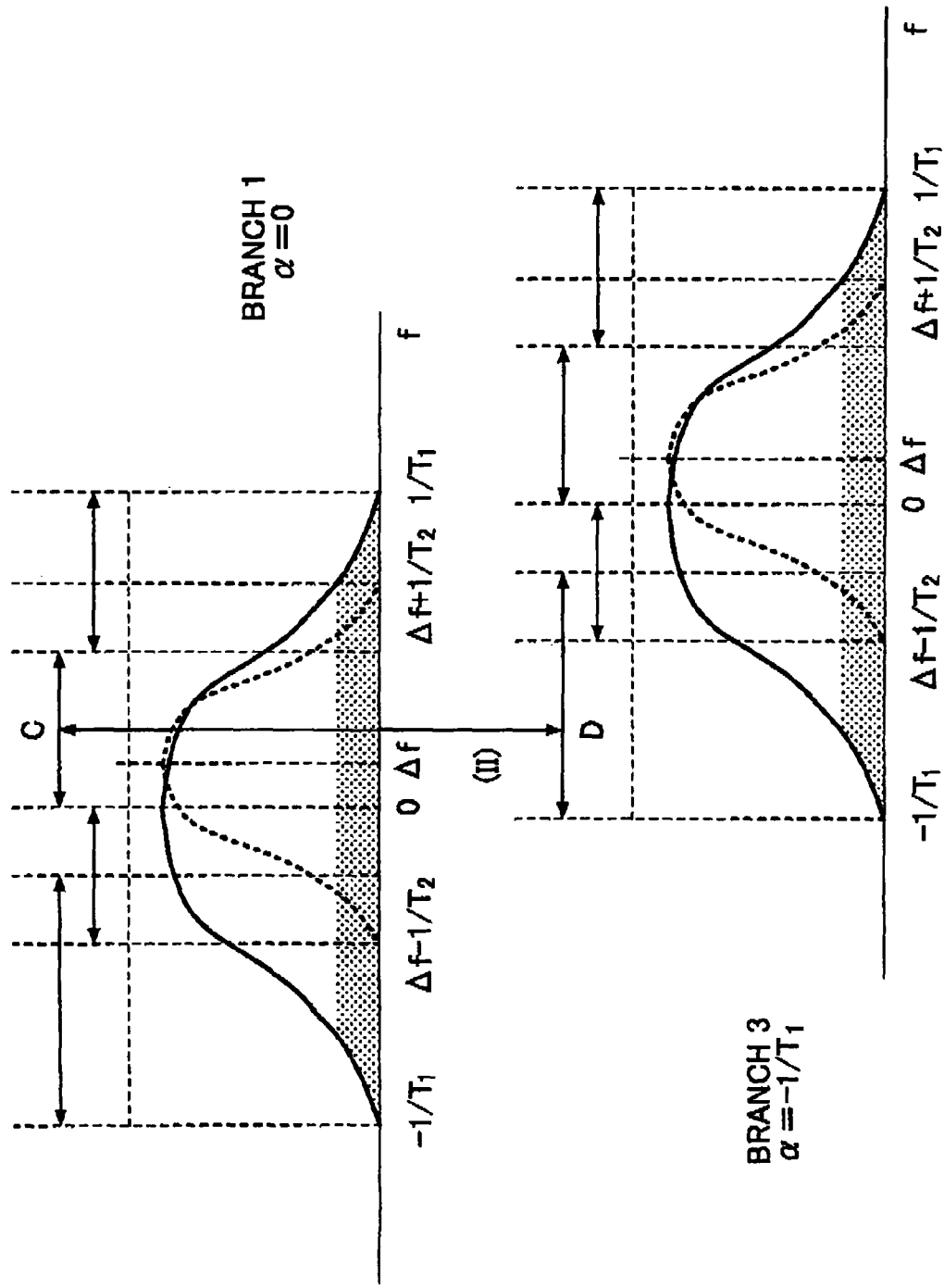
FIG. 18 shows two signals before frequency shift filter summing.

FIG. 18 is similar to FIG. 17, and shows the signal spectra appearing in the branches 1 and 3 before summing by the summing unit 164. The signal spectrum appearing in the branch 3 is shifted in the frequency axis by $1/T_1$ as shown in a lower chart of FIG. 18. These signals shifted by $1/T_1$ also have large correlation due to digital signal characteristics (i.e., the property of cyclostationarity). Therefore, the sum of the signals from the FSE filters 161, 163 becomes a large signal if the interfering signal does not exist.

An output from the summing unit 164 is input to the error signal generator 165. The error signal generator 165 outputs a difference between the output signal from the summing unit 164 and the desired signal (training signal) as an error signal.

The filter coefficients of each of the FSE filters 161, 162 and 163 are adaptively adjusted and updated so as to reduce the error signal, and this operation is repeated. If each FSE filter's coefficients can be adjusted so that the output signal from the summing unit 164 becomes large enough, it is considered that interference by the interfering signal is suppressed well enough.

Fourth Embodiment

Figure 19:
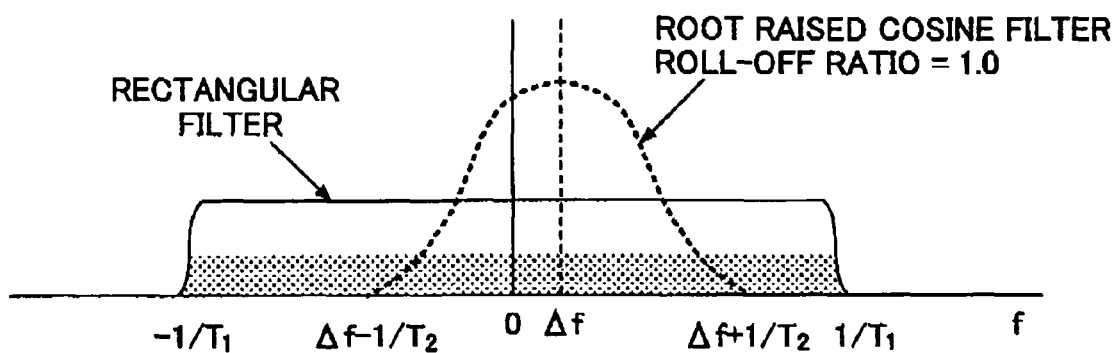
FIG. 19 is a frequency spectrum chart when a rectangular filter is used.
Figure 20:
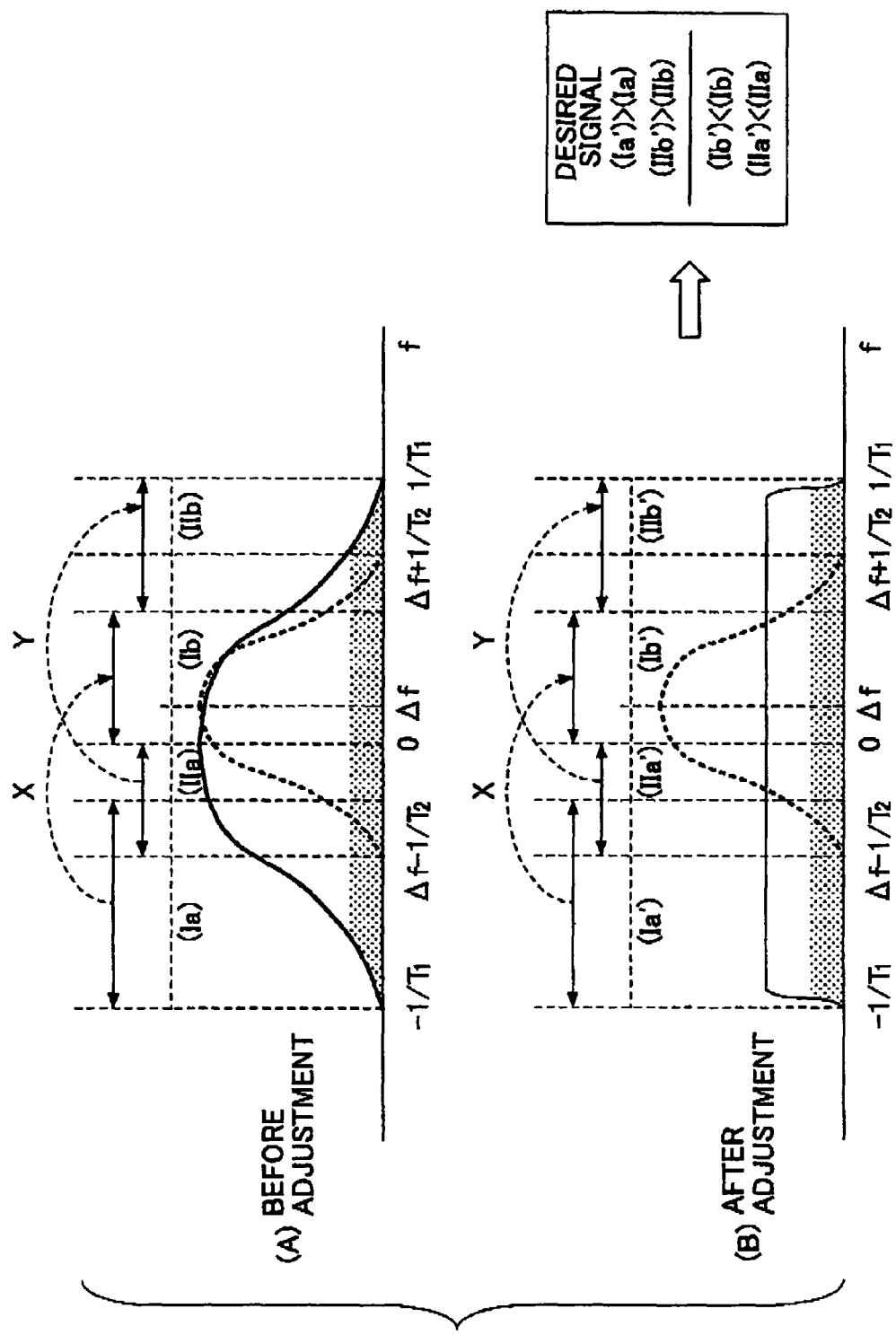
FIG. 20 shows frequency spectrum charts illustrating transfer characteristics of a root raised cosine shaping filter and a rectangular shaping filter.

In the four embodiment of the present invention, a rectangular filter as shown in FIG. 19 is used instead of a root raised cosine filter. The rectangular filter shown in FIG. 19 is a preferable low pass filter having a pass band of twice the Nyquist frequency band. In this embodiment, this rectangular filter is used as a transmission/receiving shaping filter for the desired signal. FIG. 20 shows a desired signal and an interfering signal in a case where the separation Δf between carrier frequencies is smaller than the Nyquist frequency $\frac{1}{2}T_1$. FIG. 20(A) shows the signal spectrum in a case where the first and second systems both use a root raised cosine filter, and represents wave forms the same as FIG. 17(A). FIG. 20(B) shows the signal spectrum in a case where the first system uses a rectangular filter and the second system uses a root raised cosine filter, and represents wave forms the same as FIG. 19. As clearly seen from FIG. 20, in the case where the rectangular filter is used, amplitude is large even in the frequency region beyond the Nyquist frequency band ($\frac{1}{2}T_1$), and the correlation between the branches 1 and 2 and the correlation between the branches 1 and 3 become larger than that in the third embodiment. Therefore, such rectangular shaping filters result in increasing spectrum redundancy which can be exploited by FSE and FRESH adaptive filters at the received side to cancel interference much more effectively.

FIG. 21 shows signals appearing in the branch 1 and the branch 2 in the case where the rectangular filter is used. FIG. 22 shows signals appearing in the branch 1 and the branch 3.

The preferable rectangular filter is used in this embodiment, but other types of filter can be used. For example, a filter having large amplitude characteristics in the frequency region exceeding the Nyquist frequency $\frac{1}{2}T_1$ can be used. Another transmission shaping filter that has large amplitude characteristics in the frequency region-beyond the Nyquist frequency $\frac{1}{2}T_1$, and preferably does not allow inter-symbol interference to occur, when multiplied by the receiver shaping filter, can be used.

FIG. 23 illustrates simulation results of average bit error rates in a case where shaping filters used in transmission and reception are changed in various ways. The conditions of the simulation are the same as those of FIG. 15 except that the central carrier frequency $f_2$ of the interfering signal is the same as the central carrier frequency $f_1$ of the desired signal (Δf=0). FIG. 23 represents the simulation results of the first (desired) system signal. FIG. 24 represents the simulation results of the second (interfering) system signal. FIGS. 23 and 24 show simulation results in the following cases:

(1) A case where the desired signal uses a root raised cosine filter having a roll-off rate of 1.0 as a transmission shaping filter, the interfering signal also uses a root raised cosine filter having a roll-off rate of 1.0 as a transmission shaping filter, and FSE is used as an adaptive filter (FSE RRC/RRC);

(2) A case where the desired signal uses a root raised cosine filter having a roll-off rate of 1.0 as a transmission shaping filter, the interfering signal also uses a root raised cosine filter having a roll-off rate of 1.0 as a transmission shaping filter, and FRESH is used as an adaptive filter (FRESH RRC/RRC);

(3) A case where the desired signal uses a rectangular filter having a pass band twice the Nyquist frequency band as a transmission shaping filter, the interfering signal uses a root raised cosine filter having a roll-off rate of 1.0 as a transmission shaping filter, and FSE is used as an adaptive filter (FSE Rect/RRC);

(4) A case where the desired signal uses a rectangular filter having a pass band twice the Nyquist frequency band as a transmission shaping filter, the interfering signal uses a root raised cosine filter having a roll-off rate of 1.0 as a transmission shaping filter, and FRESH is used as an adaptive filter (FRESH Rect/RRC);

(5) A case where the desired signal uses a root raised cosine filter having a roll-off rate of 1.0 as a transmission shaping filter, the interfering signal uses a rectangular filter having a pass band twice the Nyquist frequency band as a transmission shaping filter, and FSE is used as an adaptive filter (FSE RRC/Rect);

(6) A case where the desired signal uses a root raised cosine filter having a roll-off rate of 1.0 as a transmission shaping filter, the interfering signal uses a rectangular filter having a pass band twice the Nyquist frequency band as a transmission shaping filter, and FRESH is used as an adaptive filter (FRESH RRC/Rect);

(7) A case where the desired signal and the interfering signal both use a rectangular filter having a pass band twice the Nyquist frequency band as a transmission shaping filter, and FSE is used as an adaptive filter (FSE Rect/Rect); and (7) A case where the desired signal and the interfering signal both use a rectangular filter having a pass band twice the Nyquist frequency band as a transmission shaping filter, and FRESH is used as an adaptive filter (FRESH Rect/Rect).

As shown in FIGS. 23 and 24, the use of the rectangular filter gives a better average bit error rate.

The present invention is not limited to these embodiments, but variations and modifications may be made without departing from the scope of the present invention.

The present application is based on Japanese Priority Application No. 2005-179894 filed on Jun. 20, 2005 with the Japanese Patent Office, the entire contents of which are hereby incorporated by reference.

What is claimed is:

1. A communication device used in a first communication system under a frequency sharing environment where the first communication system and a second communication system establish communications within a same frequency band, comprising:

a detector for detecting an interfering signal from the second communication system to the first communication system; and a determiner for determining transfer characteristics of a transmission shaping filter according to a result of the detection, the shaping filter being adaptively modifiable and used for a desired transmission signal of the first communication system, wherein when a separation between a central carrier frequency of the desired transmission signal and an undesired signal is large, a transfer characteristics of the shaping filter is narrowed in the frequency domain or the symbol rate is lowered to narrow the signal band pass, and therefore suppress interference; and when the separation between the central carrier frequency of the desired transmission signal and the undesired signal is small, the transfer characteristics of the shaping filter in the frequency region beyond the Nyquist frequency is made larger to increase spectral redundancy and suppress interference.

2. The communication device as claimed in claim 1, wherein:
the transmission shaping filter is a low pass filter able to change a signal pass band thereof.

3. The communication device as claimed in claim 2, wherein:
the transmission shaping filter is a root raised cosine filter able to change a roll-off rate thereof.

4. The communication device as claimed in claim 2, wherein:
the transmission shaping filter has amplitude characteristics larger than those of a root raised cosine filter in frequency range beyond the Nyquist frequency, within the same bandwidth.

5. The communication device as claimed in claim 2, wherein:
the transmission shaping filter is a rectangular filter through which a band having twice the Nyquist frequency or more passes.

6. A communication method used in a first communication system under a frequency sharing environment where the first communication system and a second communication system establish communications within a same frequency band, comprising the steps of:
detecting an interfering signal from the second communication system to the first communication system;
determining transfer characteristics of a transmission shaping filter according to a result of the detection, the shaping filter being adaptively modifiable and used for a desired transmission signal of the first communication system;
when the separation between the central carrier frequencies of a desired signal and an undesired signal is large, narrowing a transfer characteristic of the shaping filter in the frequency domain or lowering the symbol rate to narrow the signal band pass, and therefore suppress interference; and
when the separation between the central carrier frequencies of the desired signal and the undesired signal is small, making the shaping filter transfer characteristic in the frequency region larger and beyond the Nyquist frequency to suppress interference.

* * * * *